(12) United States Patent
Eguchi

(10) Patent No.: US 10,816,052 B2
(45) Date of Patent: Oct. 27, 2020

(54) ELECTROMECHANICAL BRAKE SYSTEM

(71) Applicant: NTN CORPORATION, Osaka (JP)

(72) Inventor: Masaaki Eguchi, Shizuoka (JP)

(73) Assignee: NTN CORPORATION, Osaka (JP)

( * ) Notice: Subject to any disclaimer, the term of this patent is extended or adjusted under 35 U.S.C. 154(b) by 37 days.

(21) Appl. No.: 16/076,751

(22) PCT Filed: Feb. 3, 2017

(86) PCT No.: PCT/JP2017/003959
§ 371 (c)(1),
(2) Date: Aug. 9, 2018

(87) PCT Pub. No.: WO2017/138450
PCT Pub. Date: Aug. 17, 2017

(65) Prior Publication Data
US 2019/0063529 A1 Feb. 28, 2019

(30) Foreign Application Priority Data
Feb. 10, 2016 (JP) .................................. 2016-023702

(51) Int. Cl.
*F16D 65/18* (2006.01)
*B60T 13/74* (2006.01)
(Continued)

(52) U.S. Cl.
CPC .............. *F16D 65/18* (2013.01); *B60T 13/74* (2013.01); *F16D 55/2265* (2013.01);
(Continued)

(58) Field of Classification Search
CPC ...... F16D 65/18; F16D 65/0068; F16D 55/08; F16D 55/16; F16D 55/30; F16D 55/38;
(Continued)

(56) References Cited

U.S. PATENT DOCUMENTS 3,631,767 A * 1/1972 Meier ................. F15B 15/1433
92/165 R
3,991,859 A * 11/1976 Coulter ................... F16D 65/18
188/71.9

(Continued)

FOREIGN PATENT DOCUMENTS

DE 100 64 901 10/2001
EP 0381306 A1 * 8/1990 ....... F16D 55/22655
(Continued)

OTHER PUBLICATIONS

International Preliminary Report on Patentability dated Aug. 14, 2018 in International (PCT) Application No. PCT/JP2017/003959.
(Continued)

*Primary Examiner* — Thomas J Williams
(74) *Attorney, Agent, or Firm* — Wenderoth, Lind & Ponack, L.L.P.

(57) ABSTRACT

An electromechanical brake system includes a caliper body having a housing portion in which is received a linear motion mechanism for pressing a brake pad against a brake disk. A boot is coupled at its one end to an outer ring member of the linear motion mechanism, and at its other end to a support ring. The support ring abuts and is mechanically and fixedly fastened to an open end surface of the housing portion to close the open end of housing portion with the support ring and the boot.

22 Claims, 18 Drawing Sheets

(51) Int. Cl.
*F16D 55/2265* (2006.01)
*F16J 15/52* (2006.01)
*F16J 3/04* (2006.01)
*F16D 65/00* (2006.01)
*F16J 15/32* (2016.01)
*F16D 125/50* (2012.01)

(52) U.S. Cl.
CPC ............ *F16D 65/0068* (2013.01); *F16J 3/04* (2013.01); *F16J 15/32* (2013.01); *F16J 15/52* (2013.01); *F16D 2125/50* (2013.01)

(58) Field of Classification Search
CPC ....... F16D 2055/0016; F16D 2055/002; F16D 2055/0037; F16D 2055/0075; B60T 13/74; B60T 13/741; F16J 3/041; F16J 3/04; F16J 3/042; F16J 15/32; F16J 15/52
USPC .............................................. 188/72.7, 72.8
See application file for complete search history.

(56) References Cited

U.S. PATENT DOCUMENTS

| | | | | |
|---|---|---|---|---|
| 4,006,669 A * | 2/1977 | Price | ....................... | F16D 55/40 92/13.1 |
| 4,248,329 A * | 2/1981 | Torigoe | ................... | F16D 65/84 188/264 G |
| 4,375,842 A * | 3/1983 | Melinat | ............. | F16D 55/22655 188/196 P |
| 4,382,492 A * | 5/1983 | Ritsema | ................. | F16D 65/18 188/196 P |
| 4,503,947 A * | 3/1985 | Heidmann | ............. | F16D 65/18 188/370 |
| 5,172,793 A * | 12/1992 | Temple | ................... | F16D 65/18 188/322.18 |
| 5,931,268 A * | 8/1999 | Kingston | ............ | F16D 65/0006 188/158 |
| 6,279,694 B1 * | 8/2001 | Bohm | ..................... | B60T 13/74 188/1.11 E |
| 6,405,836 B1 * | 6/2002 | Rieth | ...................... | F16D 65/18 188/158 |
| 6,907,967 B1 | 6/2005 | Kapaan et al. | | |
| 6,938,735 B1 * | 9/2005 | Hilzinger | ................ | F16D 65/18 188/156 |
| 8,936,137 B2 * | 1/2015 | Yoshikawa | ............. | F16D 65/18 188/71.9 |
| 2003/0042084 A1 | 3/2003 | Kawase et al. | | |
| 2003/0050147 A1 | 3/2003 | Backes et al. | | |
| 2013/0292215 A1 | 11/2013 | Eguchi et al. | | |

FOREIGN PATENT DOCUMENTS

| | | |
|---|---|---|
| GB | 1 449 653 | 9/1976 |
| JP | 49-70059 | 7/1974 |
| JP | 57-173624 | 10/1982 |
| JP | 2012-149747 | 8/2012 |

OTHER PUBLICATIONS

International Search Report dated May 16, 2017 in International (PCT) Application No. PCT/JP2017/003959.
Extended European Search Report dated Jan. 14, 2019 in European Application No. 17750173.1.

* cited by examiner

ELECTROMECHANICAL BRAKE SYSTEM

TECHNICAL FIELD

This invention relates to an electromechanical brake system including a linear motion mechanism mounted in a caliper body, and configured to convert the rotation transmitted from an electric motor to a linear motion to press brake pads against a brake disk, thereby generating a braking force.

BACKGROUND ART

Hydraulic brake systems, which are driven under hydraulic pressure, are widely used as vehicle brake systems. However, hydraulic brake systems are not environmentally friendly because they use brake oil, and are not suitable to further improve the functions of anti-lock brake systems, stability control systems, brake assist systems, etc.

Electromechanical brakes are considered to be suitable to further improve sophisticated brake functions, and are more environmentally friendly.

An electromechanical brake system includes a brake disk that rotates together with a wheel, a pair of friction pads opposed to each other with the brake disk disposed therebetween, an electric motor, and a linear motion mechanism for converting the rotation transmitted from the electric motor to a linear motion to press the brake pads against the brake disk, and thereby generate a braking force.

JP Patent Publication 2012-149747A (i.e., JP 2012-149747) discloses an electromechanical brake system. As shown in FIG. 21 of JP 2012-149747, this electromechanical brake system includes a caliper body that straddles the outer peripheral portion of the brake disk. The caliper body has, at one end thereof, a housing portion formed with a receiving hole in which is received the linear motion mechanism for converting the rotation transmitted from the electric motor to the linear motion to press the brake pads against the brake disk.

The linear motion mechanism of JP 2012-149747 is the planetary-roller-and-threaded-engagement type, in which planetary rollers are disposed between a rotary shaft to which the rotation of the electric motor is transmitted and an outer ring member such that the planetary rollers rotate about their respective axes while rolling around the rotary shaft due to contact with the rotary shaft. The outer ring has a helical rib on the inner periphery thereof, whereas each planetary roller has, on the outer periphery thereof, circumferential grooves or a helical groove in which the helical rib engages such that the outer ring member is movable in the axial direction.

Foreign matter that enters between the sliding surfaces of the housing portion and the outer ring member from outside may make smooth axial movement of the outer ring member difficult. Thus, in order to prevent entry of foreign matter, an open end of the housing portion facing the brake disk is sealed by a boot.

Such a boot is typically made of ethylene propylene rubber (EPDM), a material known to be weather-resistant and water-resistant.

Patent Document 1: JP Patent Publication 2012-149747A

SUMMARY OF THE INVENTION

In the electromechanical brake system disclosed in JP 2012-149747, the boot is mounted in position by radially compressing one end of the boot and fitting the one end into a ring groove formed in the inner periphery of the housing portion at its open end, and radially expanding the other end of the boot and fitting the other end into a ring groove formed in the radially outer surface of the outer ring member at its end. While the boot is being mounted in this manner, the boot tends to contact lubricating oil in the linear motion mechanism at the open end of the linear motion mechanism.

Even after the boot has been mounted in position, lubricating oil for lubricating the radially outer surface of the outer ring member tends to adhere to the boot. Since EPDM, a material forming the boot, is poor in oil resistance, the boot tends to deteriorate rapidly due to contact with the lubricating oil, and is unable to maintain sealing functions for a prolonged period of time.

In order to couple the boot to the housing portion, the one end of the boot is inserted into the housing portion after radially compressing the one end, and then the one end has to be fitted into the ring groove formed in the inner periphery of the housing at its open end by its recovery elasticity after aligning the one end with the ring groove. Thus, it is difficult to successfully fit the boot into the ring groove, so that it is extremely time-consuming to initially mount the boot, as well as to replace the boot with a new one.

An object of the present invention is to provide an electromechanical brake system which has a feature that allows the boot to be easily mounted in position without contacting lubricating oil, so that the boot can be made of a material poor in oil resistance.

SUMMARY OF THE INVENTION

In order to achieve this object, the present invention provides an electromechanical brake system including a brake disk, a pair of first and second brake pads axially opposed to each other with the brake disk disposed therebetween, and a linear motion mechanism. The linear motion mechanism includes a rotary shaft configured to be rotated by an electric motor, and a tubular outer ring member, and configured such that, when the rotary shaft is rotated by the electric motor, the rotation of the rotary shaft is converted to a linear motion of the outer ring member, and the first brake disk is pressed against the brake disk. The electromechanical brake system further includes a caliper body straddling an outer peripheral portion of the brake disk, and including, at a first end thereof, a claw axially supporting the second brake pad. The component parts of the linear motion mechanism are received in an assembled state in a housing disposed at a second end of the caliper body opposite from the first end of the caliper body. A shrinkable boot closes an opening of the housing at an end of the housing opposed to the brake disk. A support ring is fitted to an outer periphery of the outer ring member at a first end of the outer ring member, and is mechanically fastened to the housing while abutting an open end surface of the housing. The boot has a first end coupled to the outer periphery of the outer ring member at the first end of the outer ring member, and a second end coupled to the support ring. The support ring may be mechanically fastened to the housing by threaded engagement, by clips, or by engaging hooks.

In mounting the boot to this electromechanical brake system, with the outer ring member of the linear motion mechanism inserted into the housing (for the linear motion mechanism), the support ring is fitted onto the outer periphery of the outer ring member at the end of the outer ring member facing the brake disk, and mechanically fastened to the housing, while abutting the open end surface of the housing. The boot is coupled to the outer ring member by radially expanding its first end and fitting the first end onto the outer periphery of the outer ring member at the first end of the outer ring member.

By, as described above, fitting the support ring onto the outer periphery of the outer ring member at the end of the outer ring member facing the brake disk, mechanically fastening the support ring to the housing, while abutting the open end surface of the housing, and then coupling the boot to the outer ring member by radially expanding its first end and fitting the first end onto the outer periphery of the outer ring member at the first end of the outer ring member, it is possible to mount the boot in position at the open end of the linear motion mechanism without contacting lubricating oil in the linear motion mechanism.

In the electromechanical brake system according to the present invention, the housing (for the linear motion mechanism) may be integral with the caliper body, or a separate member from the caliper body that is detachably attached to a housing fixing plate disposed at the second end of the caliper body, which is opposite from the brake disk.

By using, as the housing for the linear motion mechanism, a member separate from the caliper body and detachably attached to a housing fixing plate on the caliper body, the linear motion mechanism can be assembled and disassembled while dismounted from the caliper body, its maintenance is easy.

Preferably, the electromechanical brake system further comprises at least one seal ring providing a seal between the open end surface, facing the brake disk, of the housing and an abutment surface of the support ring abutting the open end surface of the housing, and between an inner periphery of the housing at an end of the housing facing the brake disk and a sliding surface of the outer ring member that is in sliding contact with the inner periphery of the housing.

The seal ring reliably prevents entry of foreign matter into the housing (for the linear motion mechanism) from outside, as well as leakage of lubricating oil in the housing.

Preferably, the at least one seal ring comprises only one seal ring fitted in a seal groove disposed at an inner peripheral portion of the open end surface of the housing and an inner peripheral portion of the abutment surface of the support ring such that the only one seal ring provides a seal between the open end surface of the housing and the abutment surface of the support ring, and between the sliding surface of the outer ring member and a sliding surface of the housing that is in sliding contact with the sliding surface of the outer ring member. This seal groove may be formed partially in the housing and partially in the support ring, or may be entirely formed in one of the housing and the support ring. With this arrangement, since only one seal ring is used, it is possible to reduce the number of parts of the brake system, which makes it easier to assemble the brake system and to reduce its cost.

The seal groove in which the only one seal ring is received may have a rectangular cross-section, or a triangular cross-section. If the seal ring has a triangular cross-section, the seal groove may be defined by two tapered surfaces inclined in opposite directions to each other. To ensure sealability, the only one seal ring should have a rectangular or circular cross-section if the seal groove has a rectangular cross-section, and should have a circular cross-section if the seal groove has a triangular cross-section.

Preferably, the support ring has a rotationally symmetrical shape, and is mechanically fastened to the housing (for the linear motion mechanism).

This rotationally symmetrical shape makes it unnecessary to consider the angular position of the support ring when mounting it to the open end surface, facing the brake disk, of the housing (for the linear motion mechanism), so that the support ring can be more easily mounted to the housing.

The linear motion mechanism may comprise a planetary roller mechanism including planetary rollers disposed between the rotary shaft and the outer ring member, and each configured to rotate about an axis of the planetary roller and revolve around the rotary shaft due to contact with the rotary shaft, and wherein the outer ring member includes, on an inner periphery thereof, a helical rib, and each of the planetary rollers has, on an outer periphery thereof, circumferential grooves or a helical groove in which the helical rib is engaged.

According to the present invention, after fitting the support ring onto the outer periphery of the outer ring member at the end of the outer ring member facing the brake disk, and mechanically fastening the support ring to the housing, while abutting the open end surface of the housing, the boot can be coupled to the outer ring member by fitting the first end of the boot to the outer periphery of the outer ring member at its first end. Thus, the boot can be mounted in position without contacting lubricating oil in the linear motion mechanism which is exposed to outside through its open end. After being mounted in position too, it is possible to prevent leakage of lubricating oil that lubricates the sliding surfaces of the outer ring member and the housing (for the linear motion mechanism) out of the housing.

Since the second end of the boot is coupled to the end, facing the brake disk, of the housing (for the linear motion mechanism) by mechanical fastening means such as thread engagement, the second end of the boot can be easily coupled to the housing.

DETAILED DESCRIPTION OF THE INVENTION

Figure 1:
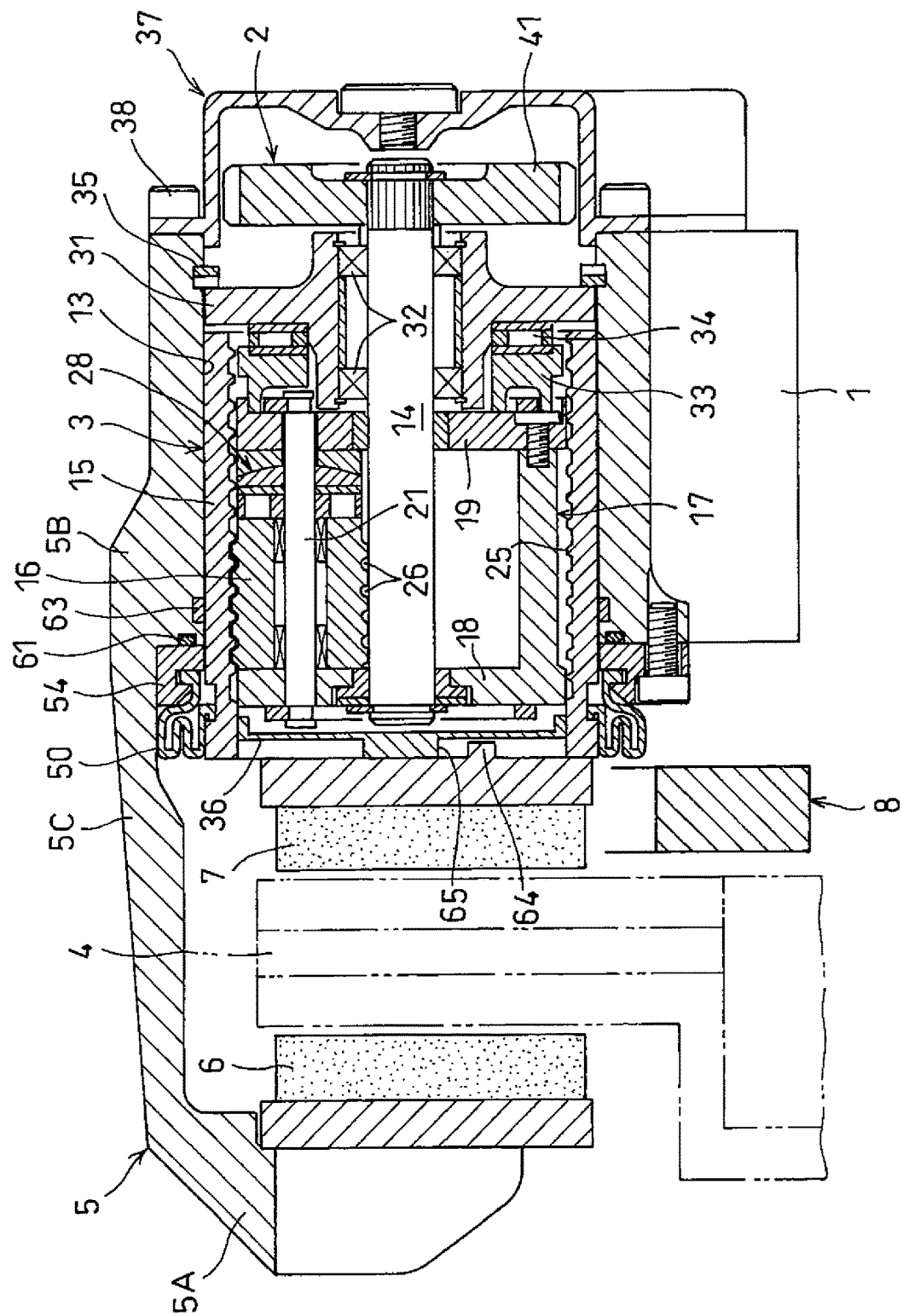
FIG. 1 is a vertical sectional view of an electromechanical brake system embodying the present invention.

An electromechanical brake system embodying the present invention is described with reference to the drawings. First referring to FIGS. 1 and 2, the electromechanical brake system includes an electric motor 1, a reduction mechanism 2 for reducing and transmitting the rotation of the electric motor 1, and a linear motion mechanism 3 for converting the rotation transmitted from the electric motor 1 through the reduction mechanism 2 to a linear motion. The linear motion mechanism 3 is received in a caliper body 5 that straddles the outer periphery of a brake disk 4. A pair of brake pads 6 and 7 are opposed to each other in the axial direction of the brake disk 4 with the brake disk 4 disposed therebetween.

The brake disk 4 is a disk-shaped member that rotates with an unillustrated wheel. The caliper body 5 includes a claw 5A and a portion 5B which serves as a housing for the linear motion mechanism 3 (this portion is therefore hereinafter referred to as "the housing portion 5B (for the linear motion mechanism 3)"), the claw 5A and the housing portion 5B being axially opposed to each other with the pair of brake pads 6 and 7 disposed therebetween, and coupled together by a bridge 5C located radially outwardly of the brake disk 4.

The caliper body 5 and a caliper base 8 constitute a caliper. The caliper base 8 is fixed to an unillustrated knuckle by tightening bolts. The caliper base 8 has substantially a U-shaped cross-section with a pair of guide pieces 9 on the respective sides thereof, and are arranged to straddle the outer peripheral portion of the brake disk 4. The caliper body 5 is mounted between the pair of guide pieces 9 so as to be axially movably supported by the caliper base 8. The pair of brake pads 6 and 7 are mounted between the pair of guide pieces 9 so as to be rotationally fixed relative to the caliper base 8 and movable toward the brake disk 4.

The housing portion 5B (for the linear motion mechanism 3) of the caliper body 5 includes shaft support pieces 11 on both sides thereof. Two guide shafts 12, each fixed at one end thereof to a respective shaft support piece 11, are slidably inserted into guide holes 10 each formed in a respective guide piece 9 so as to axially movably support the caliper body 5.

The claw 5A of the caliper body 5 axially supports the surface of the brake pad 6 opposite from the surface of the brake pad 6 facing the brake disk 4.

The housing portion 5B (for the linear motion mechanism 3) of the caliper body 5 is disposed opposite from the surface of the brake pad 7 facing the brake disk 4. The housing portion 5B includes a receiving hole 13 which opens at the end surfaces of the housing portion 5B close to and remote from the brake disk 4, respectively. The linear motion mechanism 3 is mounted in the receiving hole 13.

Figure 3:
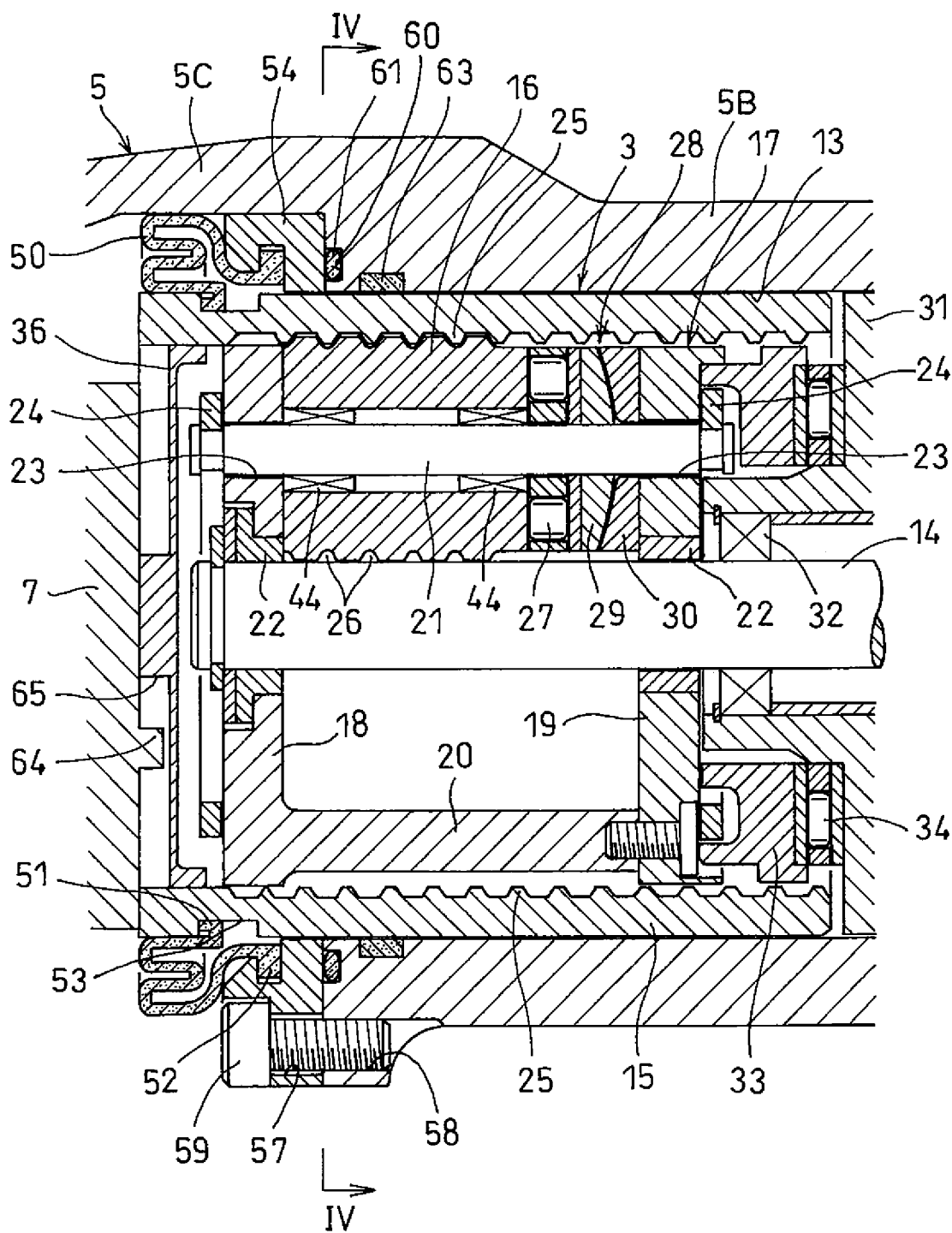
FIG. 3 shows an enlarged sectional view of a linear motion mechanism of FIG. 1.

Referring to FIG. 3, the linear motion mechanism 3 includes a rotary shaft 14 configured such that the rotation of the electric motor 1 (shown in FIG. 1) is transmitted through the reduction mechanism 2 (shown in FIG. 1). The linear motion mechanism 3 further includes a cylindrical outer ring member 15 arranged coaxial with the rotary shaft 14 so as to surround the rotary shaft 14. A plurality of planetary rollers 16 are disposed between the outer periphery of the rotary shaft 14 and the inner periphery of the outer ring member 15 while being circumferentially spaced apart from each other. A carrier 17 retains the planetary rollers 16 such that the planetary rollers 16 are capable of rotating about their respective axes and also revolving around the rotary shaft 14.

The outer ring member 15 is axially movable along the radially inner surface of the receiving hole 13. The carrier 17 includes a pair of disks 18 and 19 axially opposed to each other with the planetary rollers 16 disposed therebetween. The disks 18 and 19 are coupled together by coupling portions 20. The carrier 17 further includes roller shafts 21 each supporting a respective planetary roller 16 through radial bearings 44 so that the planetary roller 16 is rotatable about the roller shaft 21. The disks 18 and 19 are annularly shaped such that the rotary shaft 14 extends through the disks 18 and 19. Slide bearings 22 are fitted on the inner peripheries of the respective disks 18 and 19 for sliding contact with the outer periphery of the rotary shaft 14.

Each disk 18, 19 is formed with radially elongated insertion holes 23 in which are inserted the corresponding ends of the roller shafts 21 so that each roller shaft 21 is movable between the positions where the roller shaft 21 abuts one and the other ends of the corresponding insertion holes 23.

An elastic ring 24 is wrapped around first ends of the roller shafts 21, and another elastic ring 24 is wrapped around the second ends of the roller shafts 21 opposite from the first ends. The elastic rings 24 inwardly bias the roller shafts 21 so that the roller shafts 21 press, through the radial bearings 44, the planetary rollers 16 against the outer periphery of the rotary shaft 14.

The portion of the outer periphery of the rotary shaft 14 that contacts the planetary rollers 16 is a cylindrical surface. When the rotary shaft 14 rotates, each planetary roller 16 revolves, inside of the outer ring member 15, around the rotary shaft 14, while rotating about the roller shaft 21 extending through the center of the planetary roller 16.

A helical rib 25 is on the inner periphery of the outer ring member 15. The helical rib 25 extends obliquely with a predetermined lead angle relative to the circumferential direction. Each planetary roller 16 has, on the outer periphery thereof, a plurality of axially spaced apart circumferential grooves 26 in which the helical rib 25 engages. However, instead of such plurality of circumferential grooves 26, i.e., grooves zero degrees in lead angle, a helical groove having a different lead angle from that of the helical rib 25 may be formed on the outer periphery of each planetary roller 16.

A thrust bearing 27 is disposed between each planetary roller 16 and the disk 19, and supports the planetary roller 16 so as to be rotatable about its axis. An aligning seat 28 is disposed between the thrust bearing 27 and the disk 19, and supports the planetary roller 16 through the thrust bearing 27 such that the planetary roller 16 is inclinable. The aligning seat 28 comprises a pressurizing seat plate 29 and a pressure-receiving seat plate 30. The pressurizing seat plate 29 has a convex spherical surface having a center on the center axis of the roller shaft 21, while the pressure-receiving seat plate 30 has a concave surface slidably supporting the convex spherical surface of the pressurizing seat plate 29.

Referring to FIG. 1, an annular bearing support member 31 is disposed in the housing portion 5B (for the linear motion mechanism 3), on the opposite side of the outer ring member 15 from the brake disk 4 and spaced apart from the outer ring member 15. Radial bearings 32 are disposed inside of the bearing support member 31, and rotatably support the rotary shaft 14. Between the bearing support member 31 and the carrier 17, there are disposed a spacer 33 configured to rotate together with the carrier 17, and a thrust bearing 34 rotatably supporting the carrier 17 through the spacer 33.

The bearing support member 31 is prevented from being pulled out of the housing portion 5B by a stopper ring 35 attached to the wall of the receiving hole 13 at one of its two open ends remote from the brake disk 4.

A seal cover 36 is attached to the open end of the outer ring member 15 of the linear motion mechanism 3 that faces the brake disk 4 to close this open end. The seal cover 36 prevents entry of foreign matter into the outer ring member 15. The other open end of the outer ring member 15 of the linear motion mechanism 3 is left open.

Figure 2:
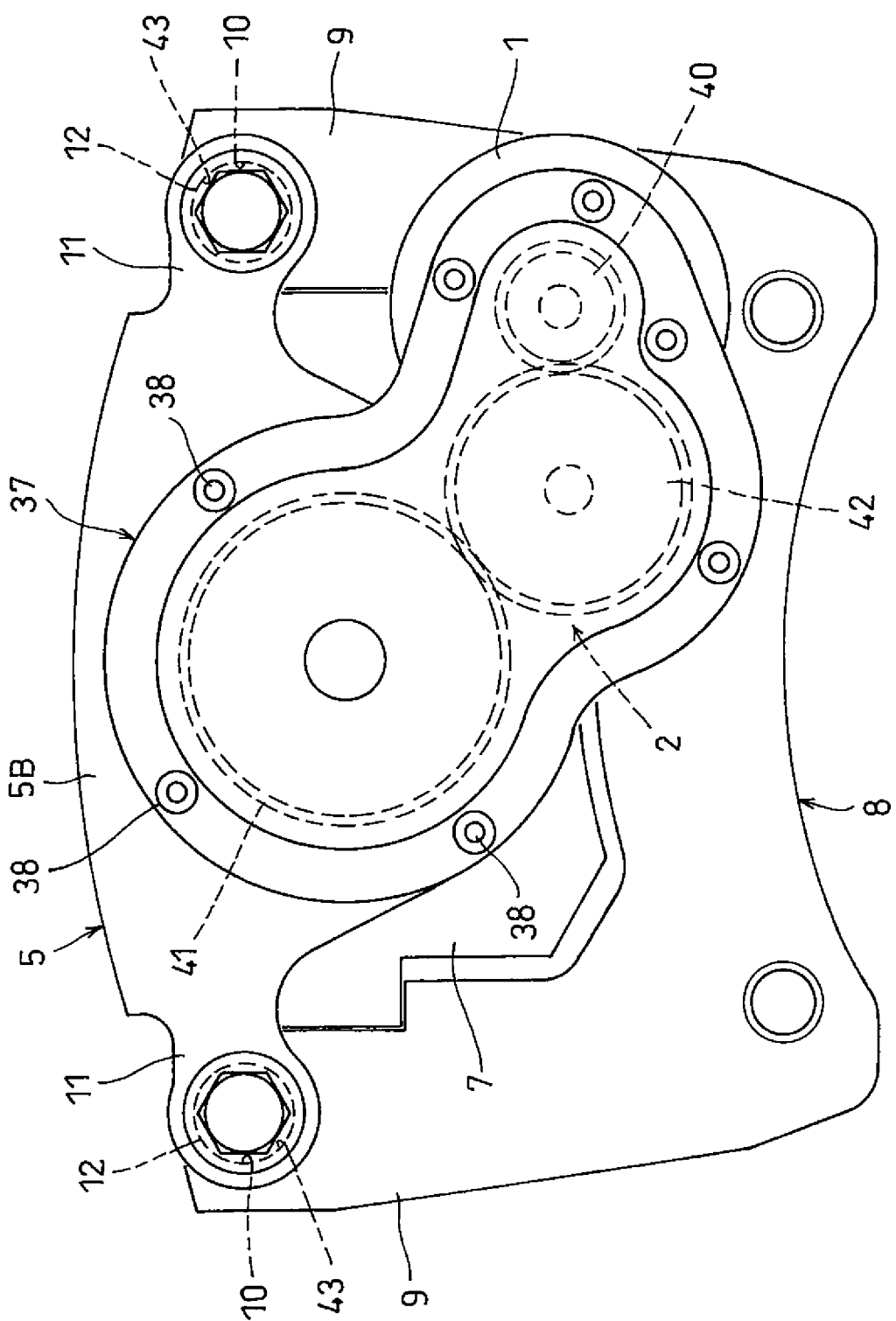
FIG. 2 is a right side view of FIG. 1.

As shown in FIGS. 1 and 2, the reduction mechanism 2 is received in a reduction mechanism housing 37. The reduction mechanism housing 37 is fixed to the housing portion 5B (for the linear motion mechanism 3) by screwing bolts 38 into the open end of the housing portion 5B opposite from the brake disk 4, and tightening them. The electric motor 1 is supported on a portion of the surface of the reduction mechanism housing 37 that is flush with the open end of the housing portion 5B opposite from the brake disk 4, at an end of the reduction mechanism housing 37 where the reduction mechanism housing 37 is not fixed to the housing portion 5B of the caliper body 5.

As shown in FIG. 2, the reduction mechanism 2 includes an input gear 40 to which the rotation of the electric motor 1 is to be transmitted, an output gear 41 configured to transmit rotation to the linear motion mechanism 3, and an intermediate gear 42 through which rotation is transmitted between the input gear 40 and the output gear 41. As shown in FIG. 1, the output gear 41 is fitted to the outer periphery of the rotary shaft 14 by splines so that rotation is transmitted from the output gear 41 to the rotary shaft 14.

Figure 4:
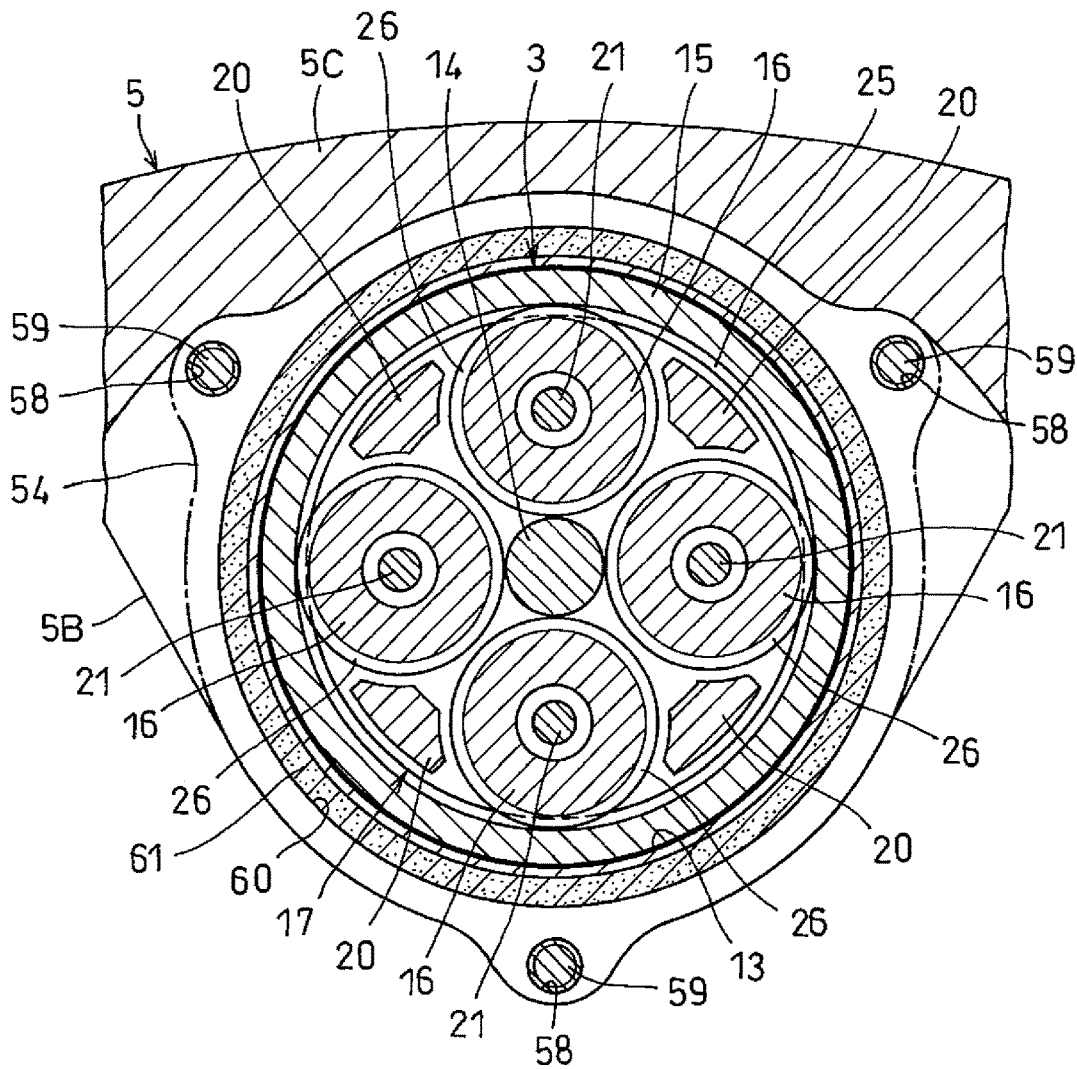
FIG. 4 is a sectional view taken along line IV-IV of FIG. 3.
Figure 5:
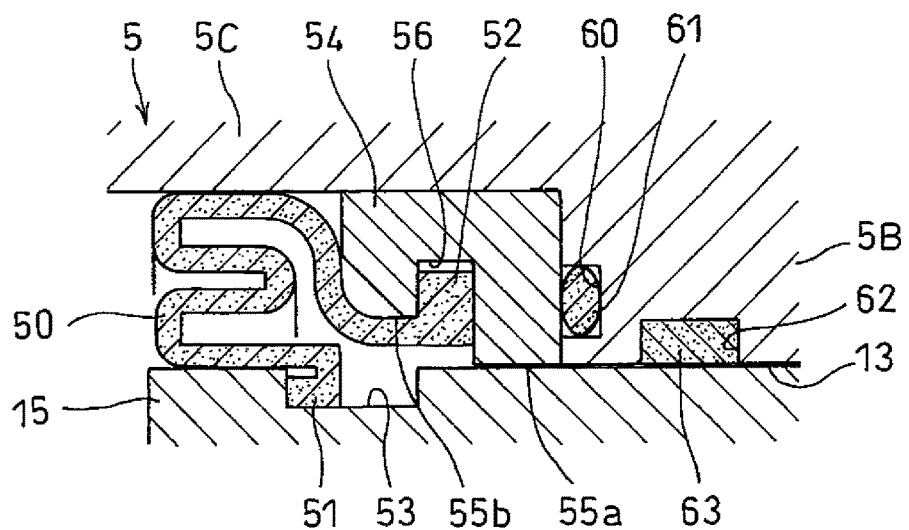
FIG. 5 shows an enlarged sectional view of a portion of FIG. 3 where a boot is mounted.

Referring to FIGS. 3-5, a boot 50 is disposed at the end, facing the brake disk 4 (shown in FIG. 1), of the housing portion 5B (for the linear motion mechanism 3), and prevents entry of foreign matter into the housing portion 5B from outside. The boot 50 is a tubular member folded like a bellows, and is made of ethylene propylene diene monomer (EPDM) rubber, a material sufficiently weather-resistant and water-resistant.

The boot 50 has protrusions 51 and 52 at the respective ends thereof, of which the protrusion 51 at a first end of the boot 50 extends inwardly and fitted in a groove 53 formed in the outer periphery of the outer ring member 15 at its end facing the brake disk 4 so that the boot 50 is directly connected at the first end thereof to the outer ring member 15.

The protrusion 52 at a second end of the boot 50 opposite from the first end extends outwardly, and a support ring 54 is connected to the protrusion 52. The support ring 54 is made of a metal but may be made of a synthetic resin instead. The inner periphery of the support ring 54 comprises two radially inner surfaces that are different in diameter from each other, of which the small-diameter radially inner surface 55a is sized such that the outer ring member 15 is slidably guided by the radially inner surface 55a. A ring groove 56 is formed in the large-diameter radially inner surface 55b, and the outwardly extending protrusion 52 at the second end of the boot 50 is fitted in the ring groove 56 so that the boot 50 is coupled to the support ring 54.

The support ring 54 has a plurality of bolt insertion holes 57 arranged at equal intervals in the circumferential direction and has a rotationally symmetrical shape such that its rotational position remains unchanged when it is rotated by 120 degrees. However, the support ring 54 may be rotationally symmetrically shaped such that its rotational position remains unchanged when it is rotated 180 degrees or 90 degrees.

The support ring 54 is fitted to the end of the outer ring member 15 facing the brake disk 4, while abutting an open end surface of the housing portion 5B (for the linear motion mechanism 3). Further, the support ring 54 is fixed to the open end surface of the housing portion 5B by inserting bolts 59 through the bolt insertion holes 57 and screwing the bolts 59 into threaded holes 58 formed in the open end surface of the housing portion 5B.

The open end surface of the housing portion 5B (for the linear motion mechanism 3) to which the support ring 54 is fixed is formed with a circular seal groove 60 whose center is located in the rotary shaft 14. A seal ring 61 is fitted in the seal groove 60. The seal ring 61 has a circular cross-section, and is in elastic contact with the support ring 54, thereby providing a seal between the open end surface of the housing portion 5B (for the linear motion mechanism 3) and the surface of the support ring 54 abutting the housing portion 5B so as to prevent entry of foreign matter into the housing portion 5B from outside.

Referring to FIG. 5, an annular seal groove 62 is formed in the inner periphery of the receiving hole 13 of the housing portion 5B (for the linear motion mechanism 3) at its end facing the brake disk 4. A seal ring 63 having a rectangular cross-section is fitted in the seal groove 62. The seal ring 63 is in elastic contact with the radially outer surface of the outer ring member 15, thereby providing a seal between the sliding surfaces of the receiving hole 13 and the outer ring member 15 so as to prevent leakage of lubricating oil in the housing portion 5B to outside.

The seal ring 61 comprises a water-resistant material. The seal ring 63 comprises a weather-resistant material. Such materials include fluororubber, silicone rubber, and nitrile rubber.

As shown in FIG. 3, the seal cover 36, closing the open end, facing the brake disk 4, of the outer ring member 15, is formed with an engagement recess 65 that engages an engagement protrusion 64 formed on the back surface of the brake pad 7, thereby preventing rotation of the outer ring member 15.

This electromechanical brake system is configured such that, when the electric motor 1 (see FIG. 2) rotates, the rotation of the electric motor 1 is transmitted through the reduction mechanism 2 to the rotary shaft 14, so that the planetary rollers 16, shown in FIGS. 3 and 4, revolves around the rotary shaft 14 while rotating about their respective axes. At that time, although the outer ring member 15 and the planetary rollers 16 are axially movable relative to each other due to the engagement of the helical rib 25 in the circumferential grooves 26, since the planetary rollers 16, as well as the carrier 17, are prevented from axial movement, only the outer ring member 15 moves in the axial direction with the planetary rollers 16 not moving in the axial direction. The linear motion mechanism 3 thus converts the rotation transmitted from the electric motor 1 to the linear motion of the outer ring member 15, and moves the brake pad 7 (see FIG. 1) together with the outer ring member 15 to press the brake pad 7 against the brake disk 4, generating a braking force.

While the braking force is being generated, an axial load is applied from the outer ring member 15 to the planetary rollers 16. Since the axial load is applied to the planetary rollers 16 through the engaging portions of the helical rib 25 on the radially inner surface of the outer ring member 15 and the circumferential grooves 26 in the radially outer surfaces of planetary rollers 16, the axial load is unevenly applied to each planetary roller 16.

Since, as shown in FIG. 3, the pressurizing seat plate 29 and the pressure-receiving plate 30 are disposed between each planetary roller 16 and the disk 19 of the carrier 17 such that the convex spherical surface and the concave surface of the respective seat plates 29 and 30 are in contact with each other, when an uneven load is applied to the planetary roller 16, the pressurizing seat plate 29 inclines while being guided by the pressure-receiving seat plate 30 such that the surface pressure at the contact portion between the pressurizing seat plate 29 and the pressure-receiving seat plate 30 is distributed uniformly in the circumferential direction.

As a result, the axial load is distributed uniformly over the entire circumference of the thrust bearing 27, which prevents uneven wear of the raceways and the rolling elements of the thrust bearing 27.

With the brake disk 4 being braked, when the electric motor 1, shown in FIG. 1, is turned in reverse, the rotary shaft 14 is rotated in the opposite direction to the above while being decelerated, and the planetary rollers 16 also revolve and rotate in the opposite direction to the above, thus retracting the outer ring member 15 due to the engagement of the helical rib 25 in the circumferential grooves 26. The brake is thus released.

Since the outer ring member 15 of the linear motion mechanism 3 for pressing the brake pad 7 against the brake disk 4 slides along the radially inner surface of the receiving hole 13 of the housing portion 5B (for the linear motion mechanism 3), any foreign matter entering the space between the sliding surfaces of the outer ring member 15 and the housing portion 5B will inhibit the smooth movement of the outer ring member 15.

However, in the electromechanical brake system of the embodiment, since, as shown in FIG. 3, the opening, facing the brake disk 4 (shown in FIG. 1), of the receiving hole 13 formed in the housing portion 5B (for the linear motion mechanism 3) of the caliper body 5 is closed by the support ring 54 abutting the open end of the housing portion 5B, and the boot 50 mounted to the support ring 54, it is possible to positively prevent entry of foreign matter between the sliding surfaces of the receiving hole 13 of the housing portion 5B (for the linear motion mechanism 3) and the outer ring member 15.

In the embodiment, as shown in FIG. 3, the seal ring 61 provides a seal between the open end surface, facing the brake disk 4, of the housing portion 5B (for the linear motion mechanism 3) and the abutment surface, abutting the open end surface of the housing portion 5B, of the support ring 54 coupled to the second end of the boot 50, thus more reliably preventing entry of foreign matter between the sliding surfaces of the receiving hole 13 of the housing portion 5B (for the linear motion mechanism 3) and the outer ring member 15. Also, the seal ring 63 provides a seal between the sliding surface of the inner periphery of the receiving hole 13 of the housing portion 5B (for the linear motion mechanism 3) at its end facing the brake disk 4, and the sliding surface of the outer ring member 15, thereby reliably preventing leakage of lubricating oil through between the sliding surfaces of the receiving hole 13 of the housing portion 5B (for the linear motion mechanism 3) and the outer ring member 15.

Figure 6:
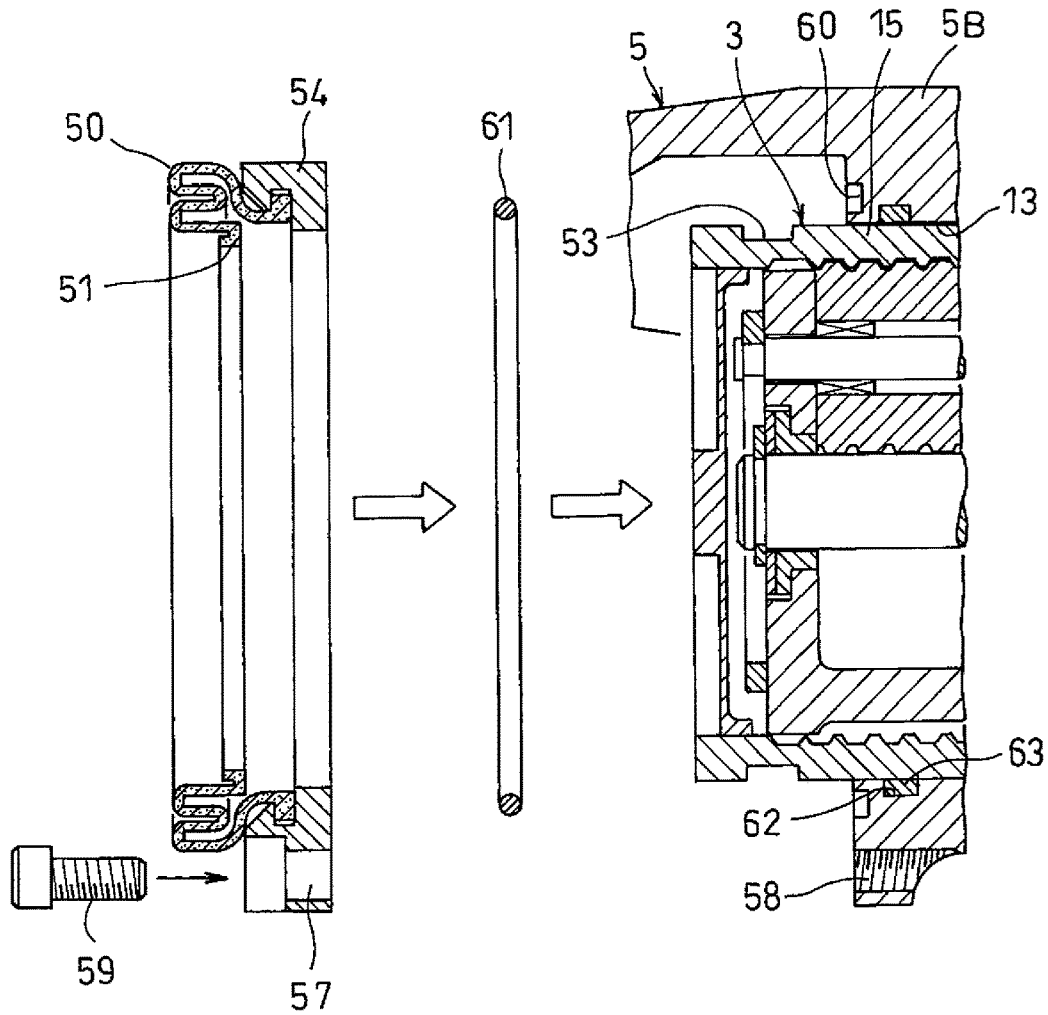
FIG. 6 is an exploded perspective view of a portion of the electromechanical brake system before the boot is mounted in position.

In mounting the boot 50, as shown in FIG. 6, with the outer ring member 15 of the linear motion mechanism 3 inserted into the receiving hole 13 of the housing portion 5B (for the linear motion mechanism 3), the seal ring 61 is fitted into the seal groove 60 formed in the open end surface, facing the brake disk 4, of the housing portion 5B (for the linear motion mechanism 3). The seal ring 63 is fitted in the seal groove 62 before inserting the linear motion mechanism 3 into the receiving hole 13 of the housing portion 5B (for the linear motion mechanism 3).

After mounting the seal ring 61, the support ring 54 is, while connected to the second end of the boot 50, fitted to the outer ring member 15 so as to abut the open end surface, facing the brake disk 4, of the housing portion 5B (for the linear motion mechanism 3). Then, the bolts 59 are inserted through the bolt insertion holes 57 formed in the support ring 54 and screwed into the threaded holes 58 formed in the open end surface of the housing portion 5B (for the linear motion mechanism 3) to fix the support ring 54 in position.

After fixing the support ring 54, the boot 50 is mounted in position by radially expanding the protrusion 51 at the first end of the boot 50, fitting the protrusion 51 onto the outer ring member 15, and moving the protrusion 51 to the position of the groove 53 formed in the radially outer surface of the outer ring member 15 to allow the protrusion 51 to be engaged in the groove 53 by the restoring elasticity of the protrusion 51.

Since, as described above, the boot 50 is mounted by fitting the support ring 54 onto the outer periphery of the outer ring member 15 at its end facing the brake disk 4 so as to abut the open end surface of the housing portion 5B (for the linear motion mechanism 3), fixing the support ring 54 by tightening the bolts 59, and then fitting the protrusion 51 at the first end of the boot 50 onto the outer periphery of the outer ring member 15 at its end, and coupling the protrusion 51 to the groove 53, the boot 50 can be mounted in position without the possibility of adhesion of lubricating oil in the linear motion mechanism to the boot at the open end of the outer ring member 15 of the linear motion mechanism 3, which is left open.

Since the support ring 54 is fastened to the housing portion 5B (for the linear motion mechanism 3) by the bolts 59, the boot 50 can be easily removed and replaced with a new one by removing the bolts 59, if, for example, the boot 50 is damaged. By removing the boot 50, the seal ring 61 is exposed to outside, so that the replacement of the seal ring 61 is also easy.

In FIG. 5, the seal ring 61 is mounted in a seal groove 60 formed in the open end surface, facing the brake disk, of the housing portion 5B (for the linear motion mechanism 3). Alternatively, as shown in FIG. 7, the seal ring 61 may be mounted in a seal groove 66 formed in the support ring 54.

Figure 7:
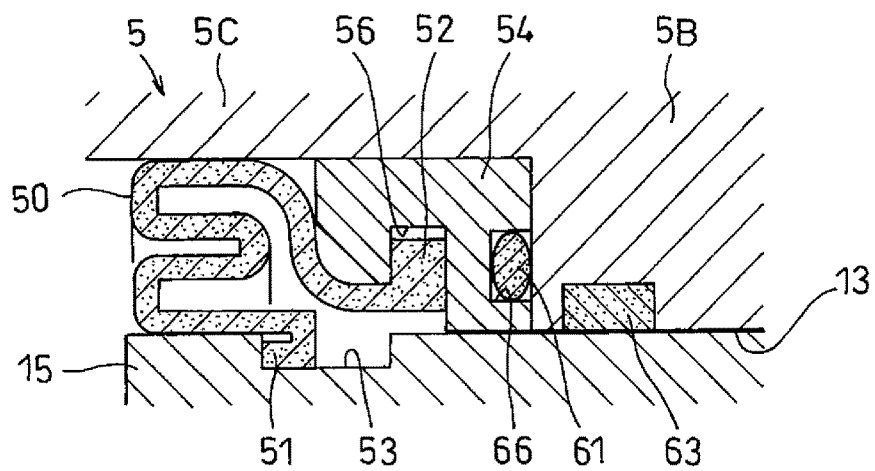
FIG. 7 shows a sectional view of a different seal device for sealing between abutment surfaces of a housing for the linear motion mechanism and a support ring, and between sliding surfaces of the housing and an outer ring member.
Figure 8:
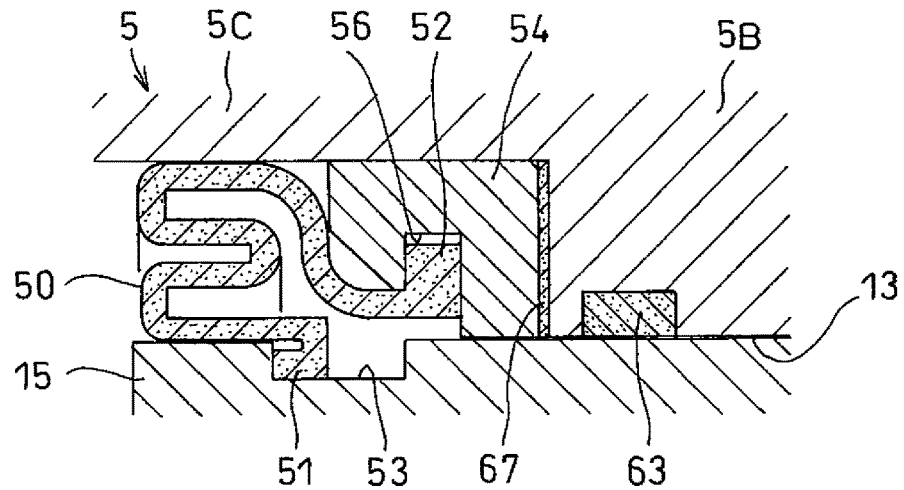
FIG. 8 shows a sectional view of still another seal device.

Further alternatively, instead of the seal ring 61 shown in FIGS. 5 and 7, a seal may be provided between the open end surface of the housing portion 5B (for the linear motion mechanism 3) and the surface of the support ring 54 abutting the open end surface of the housing portion 5B, by disposing therebetween a sheet-shaped seal member 67 shown in FIG. 8, or by applying therebetween a liquid gasket. The liquid gasket is easily removable with a dedicated remover, so that it will never make the replacement of the boot 50 difficult.

When using the sheet-like seal member 67 or the liquid gasket, neither of the seal grooves 60 and 66 is necessary.

In FIGS. 3 and 7, a seal ring having a circular cross-section is used as the seal ring 61 to seal between the open end surface of the housing portion 5B (for the linear motion mechanism 3) and the surface of the support ring 54 abutting the open end surface of the housing portion 5B, while a seal ring having a rectangular cross-section is used as the seal ring 63 to seal between the inner periphery of the receiving hole 13 of the housing portion 5B at its end facing the brake disk 4, and the sliding surface of the outer ring member 15. However, the seal rings 61 and 63 are not limited thereto. For example, the seal ring 61 may be have a rectangular cross-section, while the seal ring 63 may have a circular, or an X-shaped cross-section.

Figure 9:
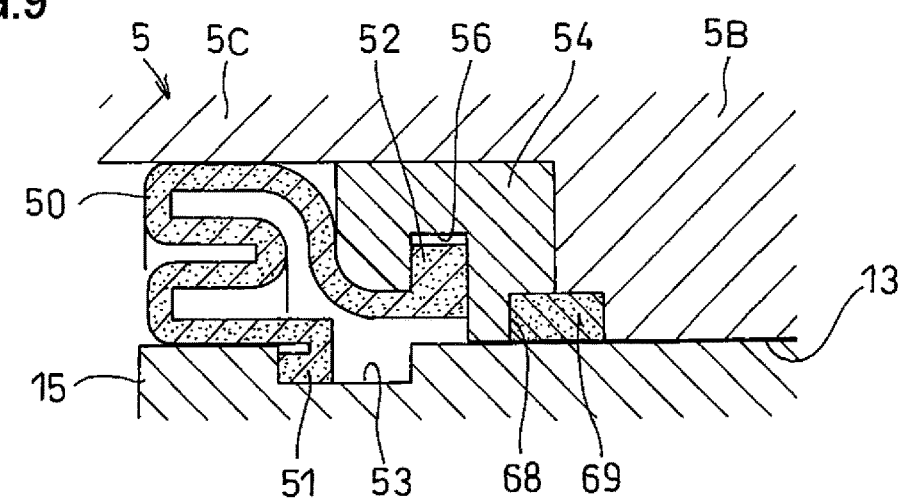
FIG. 9 shows a sectional view of yet another seal device.

FIG. 9 shows another seal device that provides a seal between the abutment surfaces of the housing portion 5B (for the linear motion mechanism 3) and the support ring 54, and between the sliding surfaces of the housing portion 5B and the outer ring member 15. The seal device of FIG. 9 comprises a seal ring 69 having a rectangular cross-section, and fitted in a seal groove 68 formed partially in the inner peripheral portion of the open end surface, facing the brake disk 4, of the housing portion 5B (for the linear motion mechanism 3), and partially in the inner peripheral portion of the abutment surface of the support ring 54, so as to have a rectangular cross-section as a whole. Thus, this seal device provides a seal between the open end surface of the housing portion 5B and the abutment surface of the support ring 54, as well as between the sliding surfaces of the housing portion 5B and the outer ring member 15, thereby preventing entry of foreign matter and leakage of lubricating oil.

When the seal device shown in FIG. 9 is used, after fitting the seal ring 69 in the portion of the seal groove 68 in the housing portion 5B (for the linear motion mechanism 3), the support ring 54, and the boot 50 connected to the support ring 54, are mounted in position.

Figure 10:
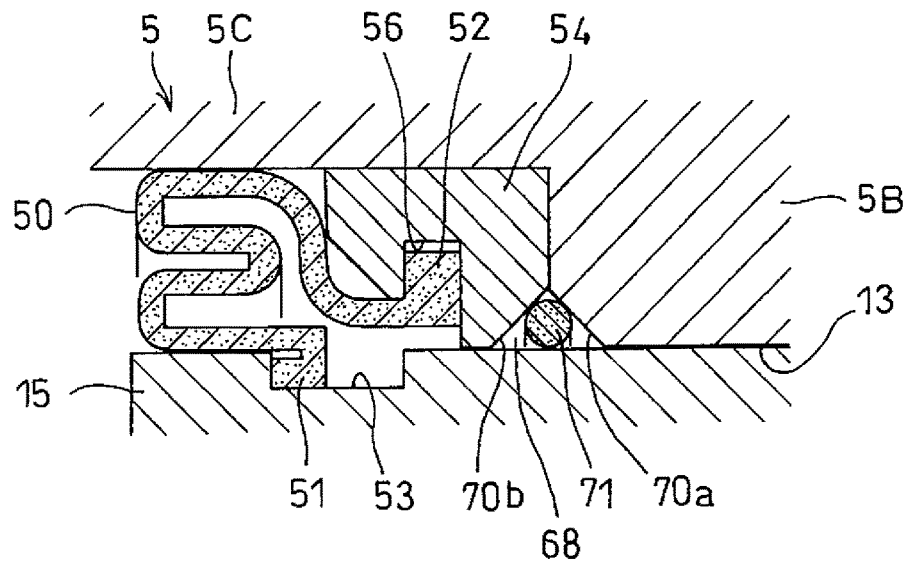
FIG. 10 shows a sectional view of a still different seal device.
Figure 11:
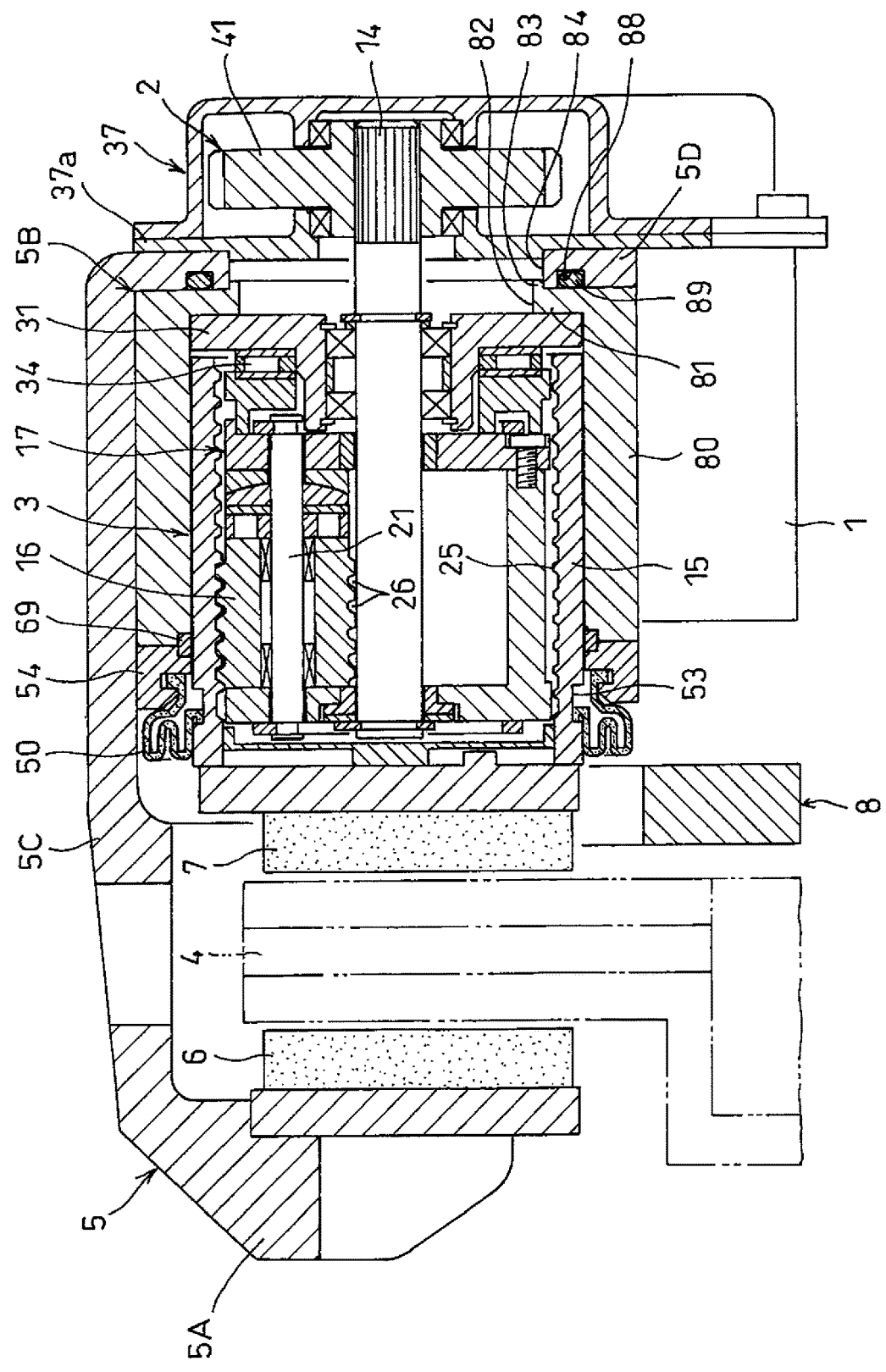
FIG. 11 is a vertical sectional view of an electromechanical brake system of another embodiment of the invention.
Figure 12:
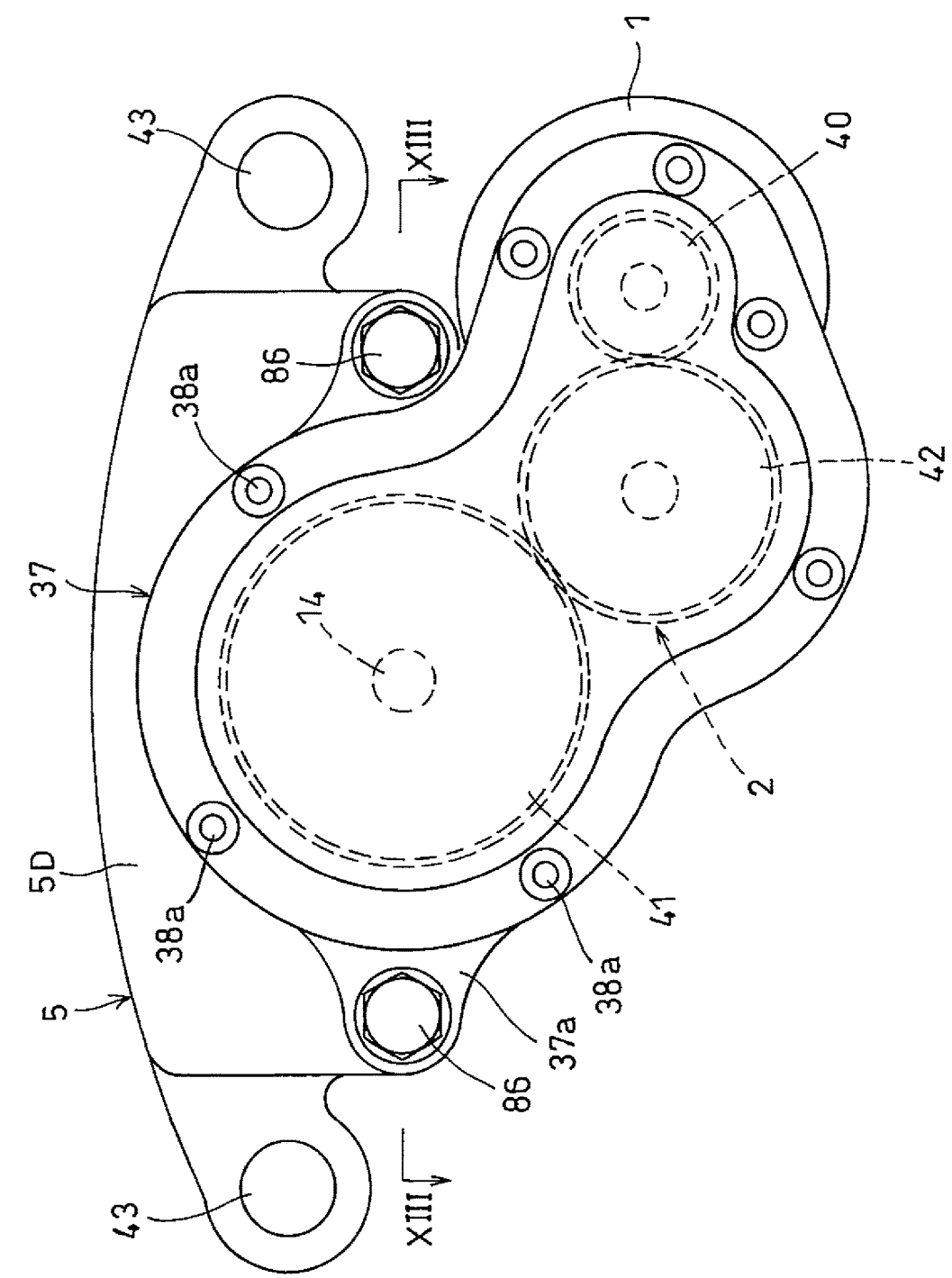
FIG. 12 is a right side view of FIG. 11.
Figure 13:
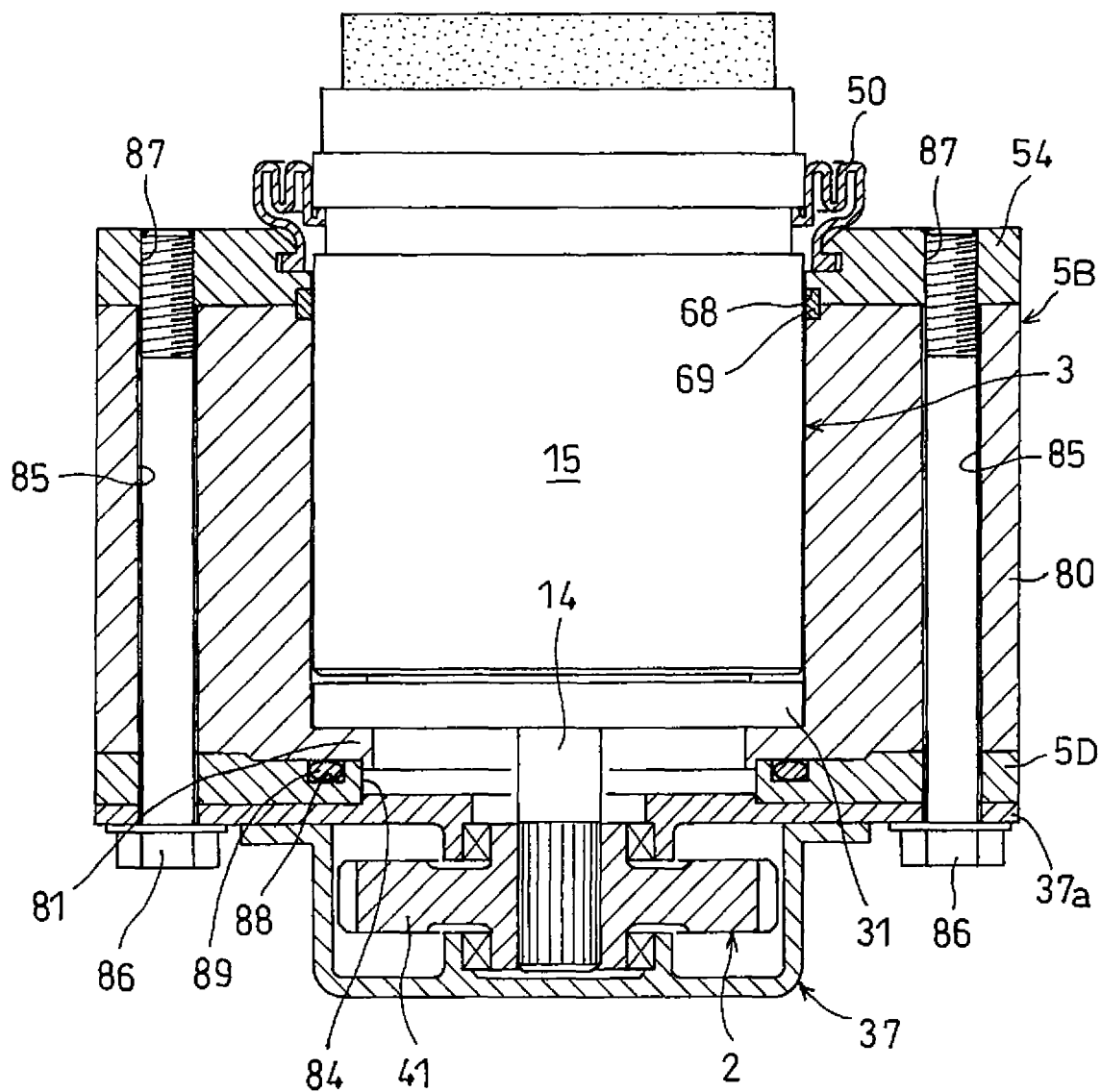
FIG. 13 is a sectional view taken along line XIII-XIII of FIG. 12.
Figure 14:
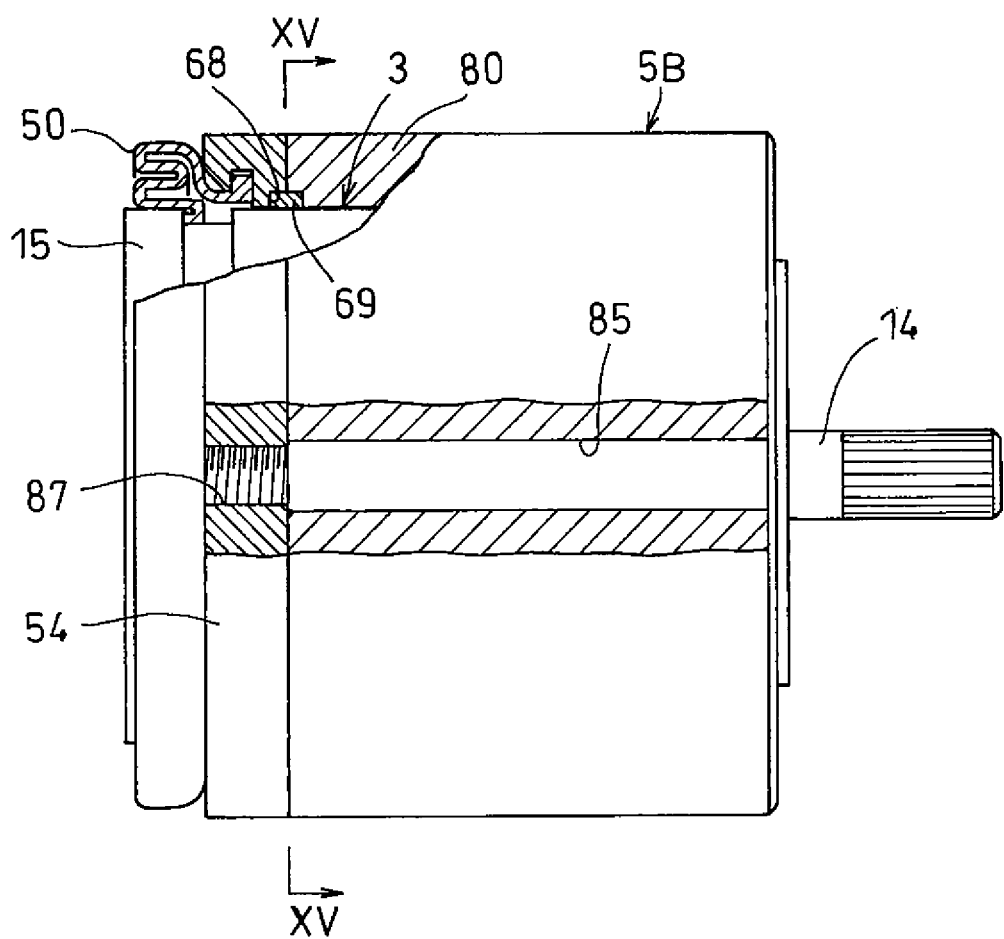
FIG. 14 shows a sectional view of an assembly of the housing for the linear motion mechanism and the linear motion mechanism.
Figure 15:
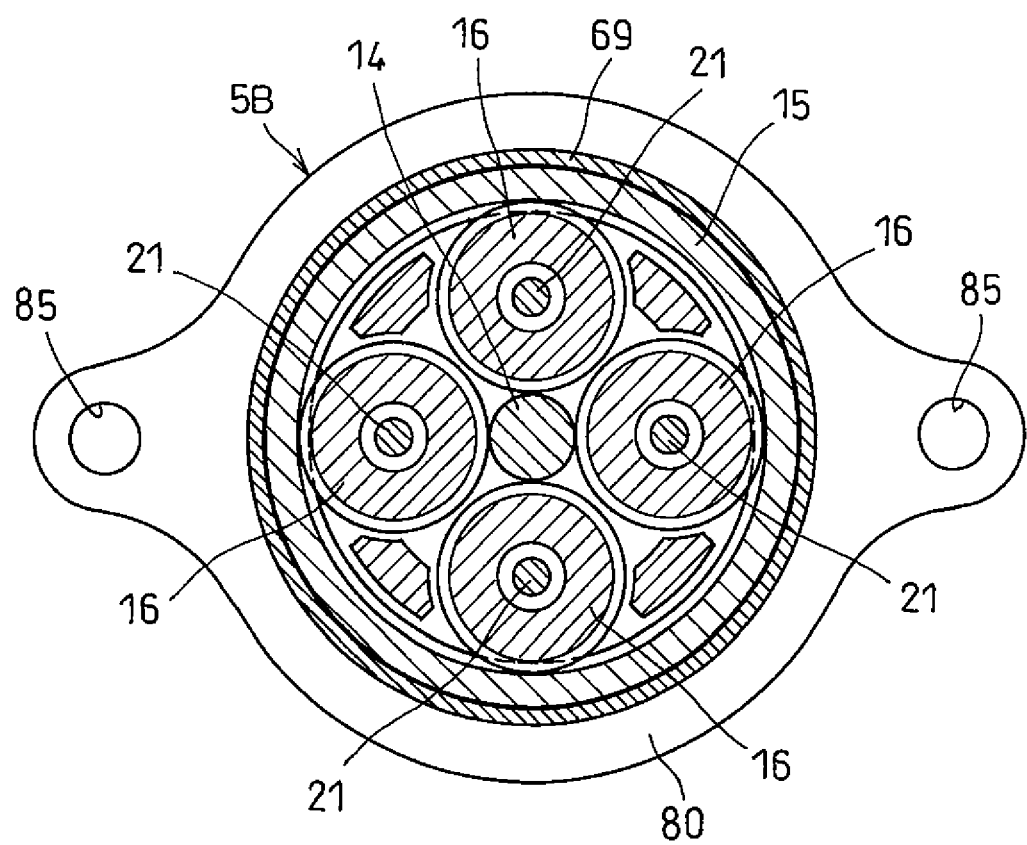
FIG. 15 is a sectional view taken along line XV-XV of FIG. 14.

In FIG. 9, the seal groove 68 is shown as having a rectangular cross-section, but instead, the seal groove 68 may include, as shown in FIG. 10, two tapered surfaces 70a and 70b inclined in opposite directions to each other so as to have a triangular cross-section. In this seal groove 68, a seal ring 71 having a round cross-section is fitted to provide a seal between the open end surface of the housing portion 5B (for the linear motion mechanism 3) and the abutment surface of the support ring 54, as well as between the sliding surfaces of the housing portion 5B and the outer ring member 15. The seal rings 69 of FIG. 9 and the seal ring 71 of FIG. 10 are both preferably made of a material that is highly resistant to both water and oil, such as nitrile rubber.

Figure 22:
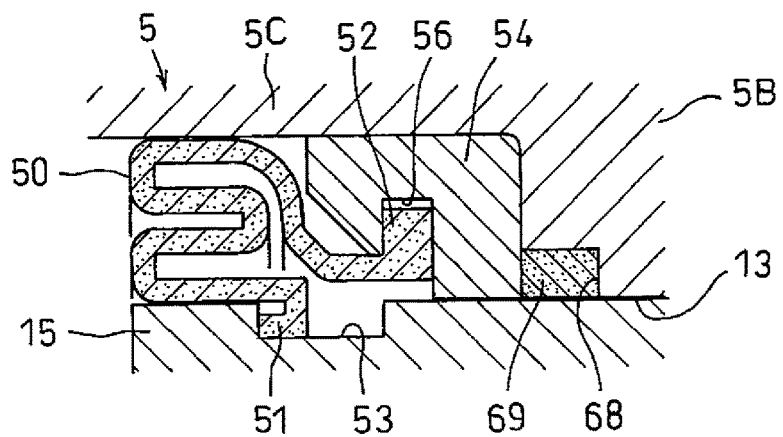
FIG. 22 shows a sectional view of still another seal device.
Figure 24:
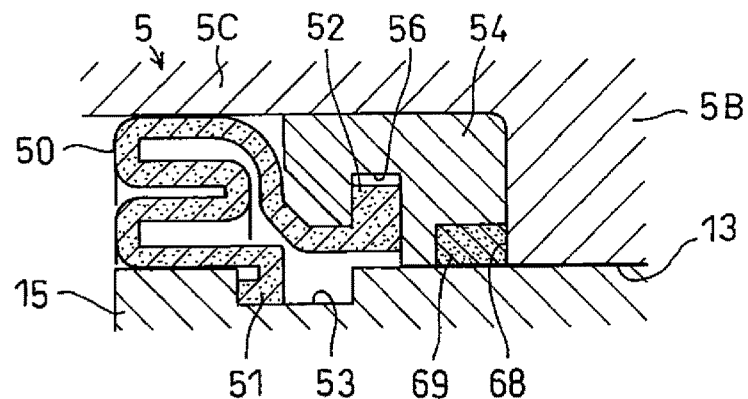
FIG. 24 shows a sectional view of a still different seal device.

In the embodiment of FIG. 9, the seal groove 68 is formed partially in the housing portion 5B (for the linear motion mechanism 3), and partially in the support ring 54, but instead, as shown in FIG. 22, the seal groove 68 may be formed in the housing portion 5B such that its one side is defined by a portion of the abutment surface of the support ring 54. Further alternatively, as shown in FIG. 24, the seal groove 68 may be formed in the support ring 54 such that its one side is defined by a portion of the open end surface of the housing portion 5B (for the linear motion mechanism 3).

Figure 23:
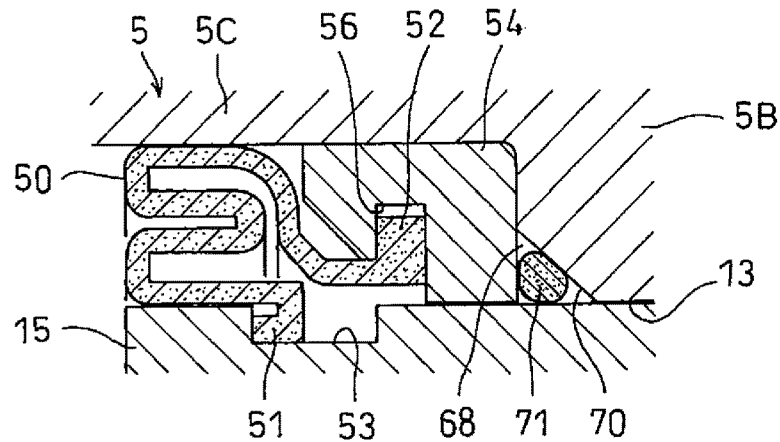
FIG. 23 shows a sectional view of yet another seal device.
Figure 25:
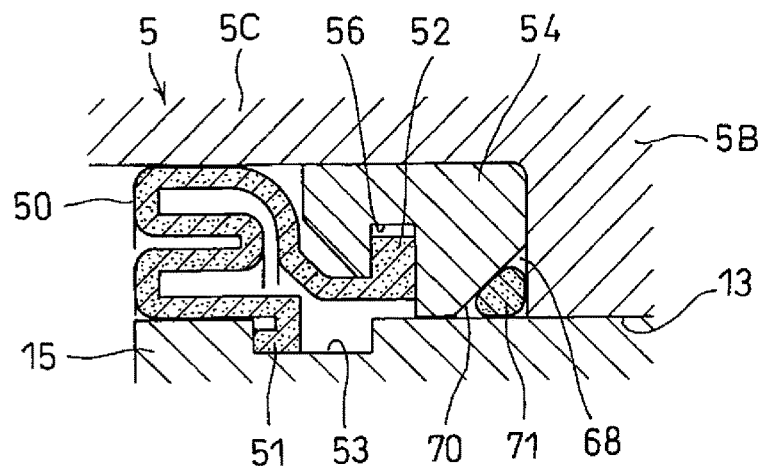
FIG. 25 shows a sectional view of a further different seal device.

Further alternatively, the seal groove 68 may comprise, as shown in FIG. 23, only a portion of the triangular seal groove 68 shown in FIG. 10 formed in the housing portion 5B (for the linear motion mechanism 3) and having only one tapered surface 70 such that its one side is defined by a portion of the abutment surface of the support ring 54. Still further alternatively, the seal groove 68 may comprise, as shown in FIG. 25, only a portion of the triangular seal groove 68 shown in FIG. 10 formed in the support ring 54 and having only one tapered surface 70 such that its one side is defined by a portion of the open end surface of the housing portion 5B (for the linear motion mechanism 3).

In FIG. 1, the integral portion 5B of the caliper body 5 is used as a housing for the linear motion mechanism 3. In FIGS. 11 to 15, a member 5B which is separate from the caliper body 5 is used as a housing for the linear motion mechanism 3 (this member 5B of FIGS. 11 to 15 is therefore hereinafter referred to as "the housing 5B (for the linear motion mechanism 3)"). The housing 5B may be detachably mounted to a housing fixing plate 5D disposed at the end of the bridge 5C of the caliper body 5.

The housing 5B (for the linear motion mechanism 3), which is a separate member from the caliper body 5, comprises a tubular portion 80 (in which the linear motion mechanism 3 is received as an assembly), and an end plate 81 disposed at one end of the tubular portion 80. The linear motion mechanism 3 of this embodiment is identical to the linear motion mechanism 3 shown in FIG. 1 except that its shape is slightly different. Thus, its elements identical to those of the linear motion mechanism 3 shown in FIG. 1 are denoted by the same numerals and their description is omitted.

In the electromechanical brake system shown in FIGS. 11 to 15, the end plate 81 has a center hole 82, and includes a cylindrical portion 83 formed, coaxial with the center hole 82, on the outer side surface of the end plate 81 which abuts the housing fixing plate 5D. The cylindrical portion 83 is fitted in a shaft insertion hole 84 formed in the housing fixing plate 5D so as to hold the housing 5B (for the linear motion mechanism 3) in position.

With the housing 5B (for the linear motion mechanism 3) held in position, and with the support ring 54 abutting the open end surface of the tubular portion 80 of the housing 5B, a plurality bolts 86 are inserted through respective bolt insertion holes 85 each extending through a bottom plate 37a disposed on the reduction mechanism housing 37, the housing fixing plate 5D, and the tubular portion 80 of the housing 5B, and are threadedly engaged in respective threaded holes 87 formed in the support ring 54, so as to fasten the support ring 54 to the tubular portion 80 of the housing 5B with the end opening of the tubular portion 80 closed by the support ring 54 and the boot 50. Bolts 38a mounted to the reduction mechanism housing 37 fasten the housing 37 and bottom plate 37a together.

A seal ring 89 is fitted in a circular seal groove 88 formed, coaxial with the shaft insertion hole 84, in the inner side surface of the housing fixing plate 5D, to provide a seal between the abutment surfaces of the housing fixing plate 5D and the end plate 81.

In this embodiment too, the same seal device as shown in FIG. 9 is used to provide a seal between the abutment surfaces of the housing 5B (for the linear motion mechanism 3) and the support ring 54, and between the sliding surfaces of the housing portion 5B and the outer ring member 15. However, any one of the seal devices shown in FIGS. 3, 7, 8, 10, and 22-25 may be used instead.

The electromechanical brake system shown in FIGS. 11 to 15 is advantageous in that since the housing 5B (for the linear motion mechanism 3) and the reduction mechanism housing 37 can be dismounted by removing the bolts 86, its maintenance is easy.

Figure 16A:
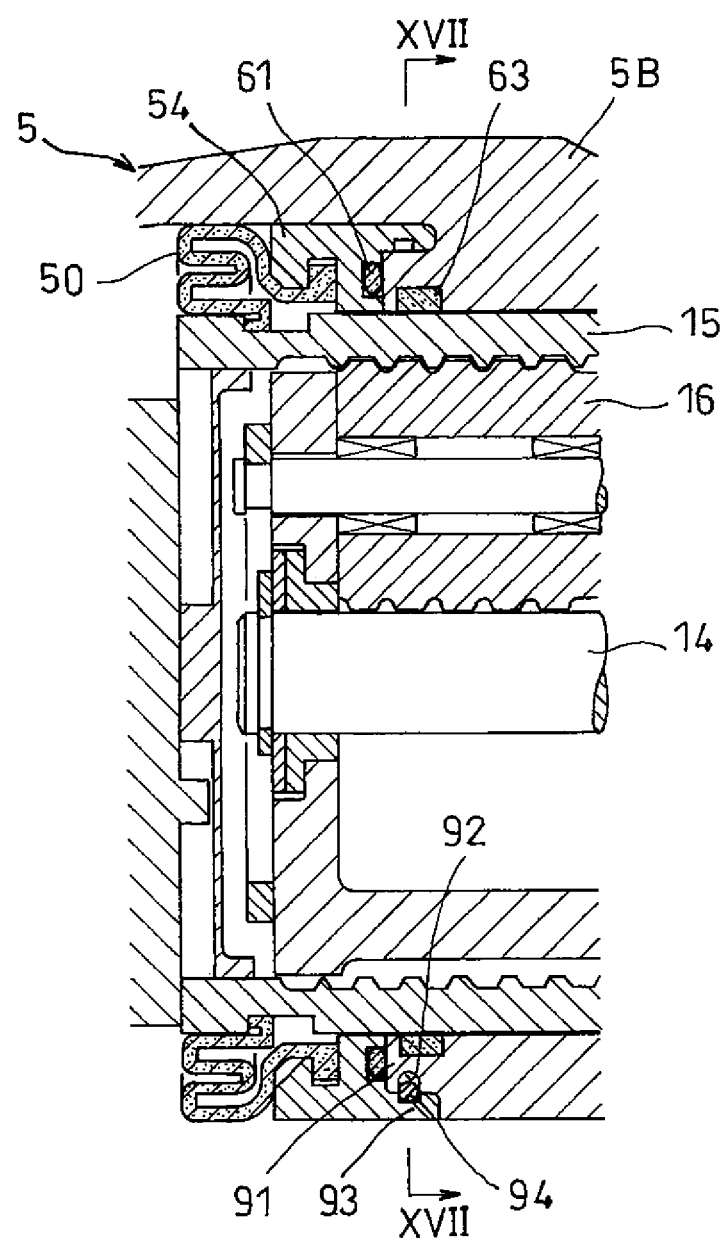
FIG. 16A shows a sectional view of a different means for mechanically fastening the housing for the linear motion mechanism to the support ring.
Figure 16B:
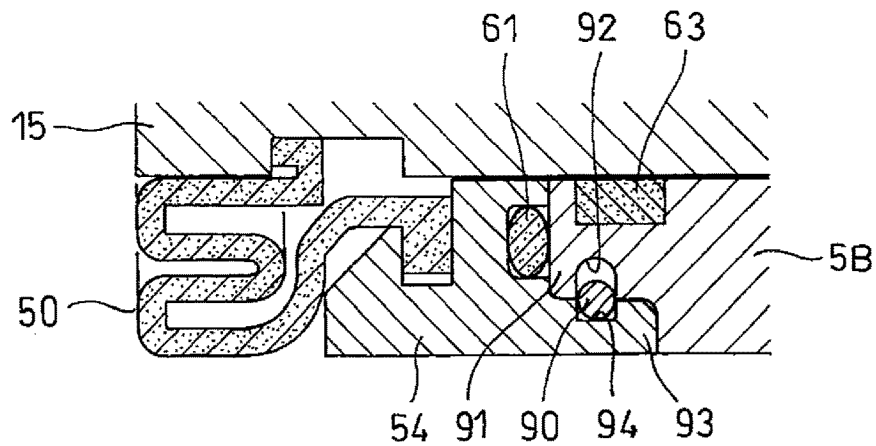
FIG. 16B shows an enlarged sectional view of the fastened portion of FIG. 16A.
Figure 17:
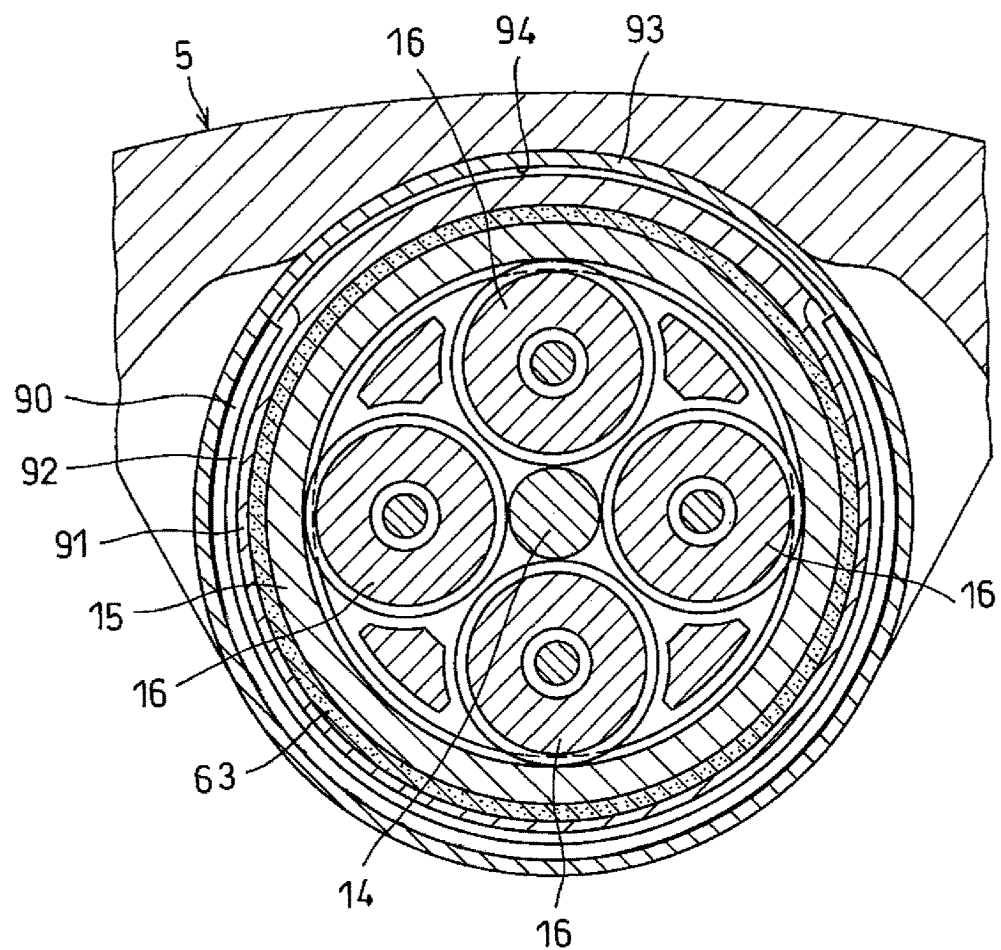
FIG. 17 is a sectional view taken along line XVII-XVII of FIG. 16A.

In the embodiment of FIGS. 1 to 6, the housing portion 5B (for the linear motion mechanism 3) and the support ring 54 are fastened together by the bolts 59, but they may be fastened together by a circlip 90 as shown in FIGS. 16A, 16B and 17. In FIGS. 16A, 16B and 17, the housing portion 5B (for the linear motion mechanism 3) includes, at its open end, a small-diameter, ring-coupling tubular portion 91 having a radially outer surface formed with a ring groove 92 having a circumferentially discontinuous portion, whereas the support ring 54 includes a tubular fitting portion 93 fitted to the ring-coupling tubular portion 91 and having a radially inner surface formed with an annular engaging groove 94. The circlip 90 has a circumferentially discontinuous portion, and is disposed partially in the engaging groove 94 and partially in the ring groove 92.

To mount the circlip 90 in position, the circlip 90 is fitted into the ring groove 92 of the ring-coupling tubular portion 91, and radially compressed until the circlip 90 is entirely received in the ring groove 92, and in this state, the tubular fitting portion 93 of the support ring 54 is fitted to the ring-coupling tubular portion 91. To dismount the support ring 54, the support ring 54 is separated from the ring-coupling tubular portion 91 by pulling it with a strong force to radially compress the circlip 90.

Figure 18A:
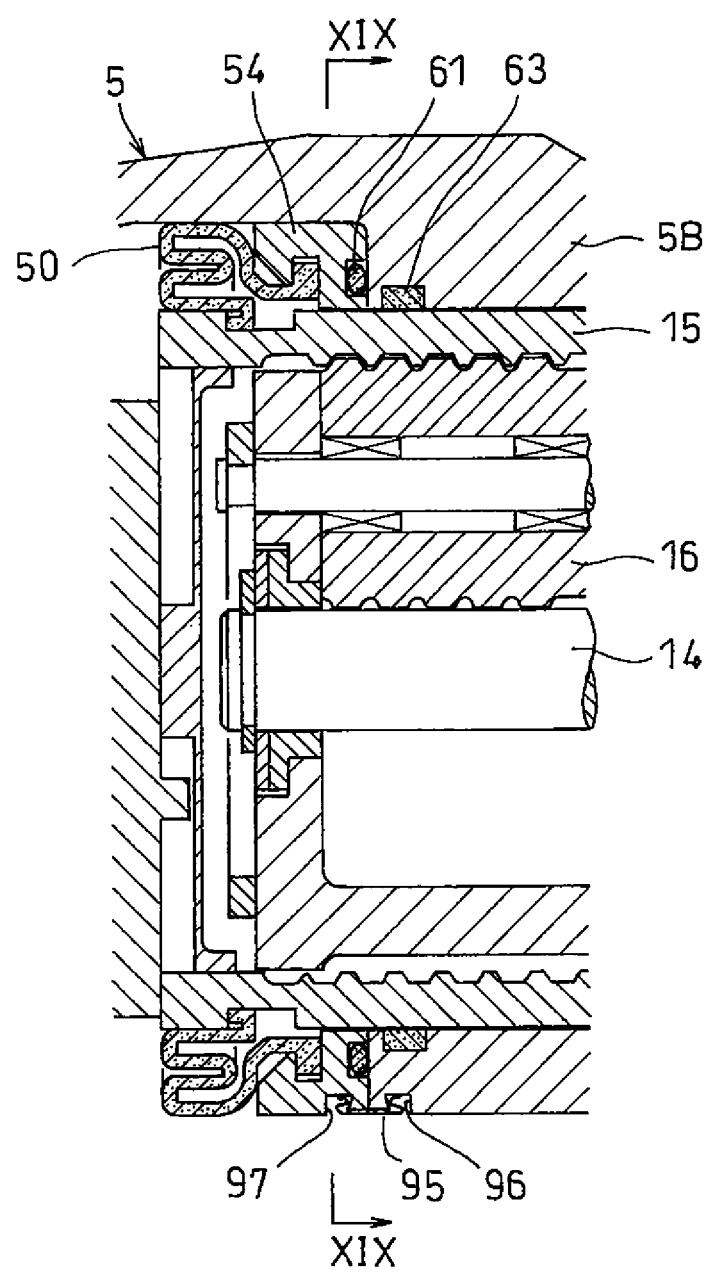
FIG. 18A shows a sectional view of a still different means for mechanically fastening the housing for the linear motion mechanism to the support ring.
Figure 18B:
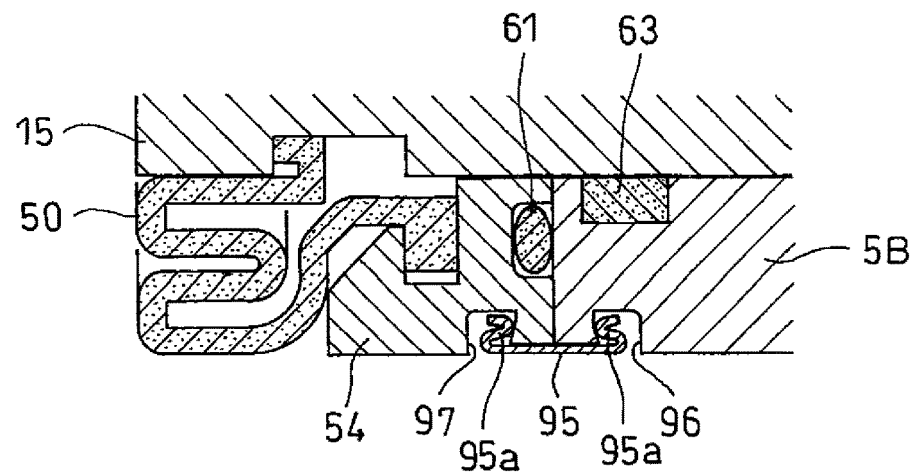
FIG. 18B shows an enlarged sectional view of the fastened portion of FIG. 18A.
Figure 19:
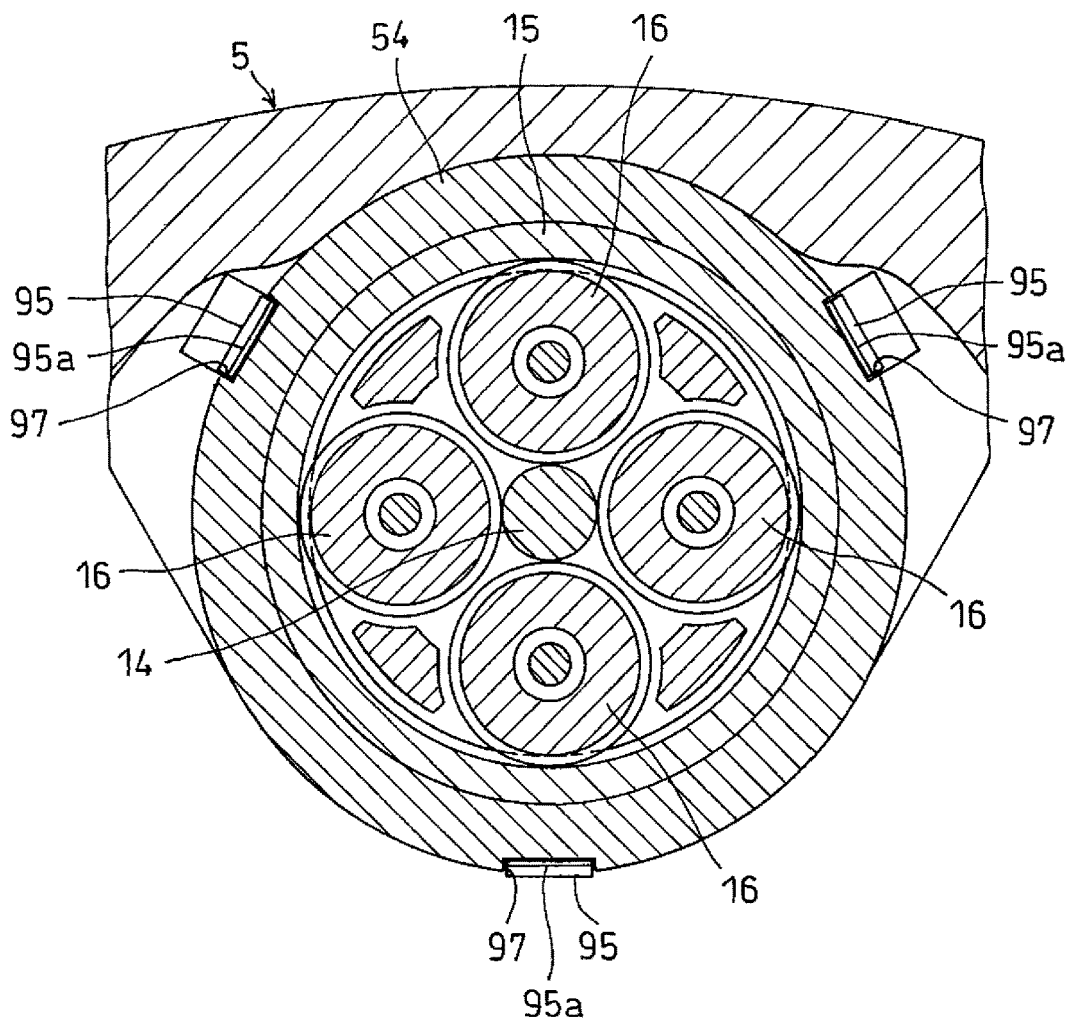
FIG. 19 is a sectional view taken along line XIX-XIX of FIG. 18A.

In the embodiment of FIGS. 18A, 18B and 19, clips 95 that span the housing portion 5B (for the linear motion mechanism 3) and the support ring 54 mechanically fasten their radially outer surfaces together. In particular, in this embodiment, circumferential grooves 96 and 97 are formed in the respective radially outer surfaces of the housing portion 5B (for the linear motion mechanism 3) and the support ring 54, and the clips 95 have first and second bent pieces 95a at the respective ends thereof that are engaged in the respective circumferential grooves 96 and 97, to fasten together the housing portion 5B and the support ring 54. The clips 95 are arranged at equal angular intervals of 120 degrees.

Figure 20A:
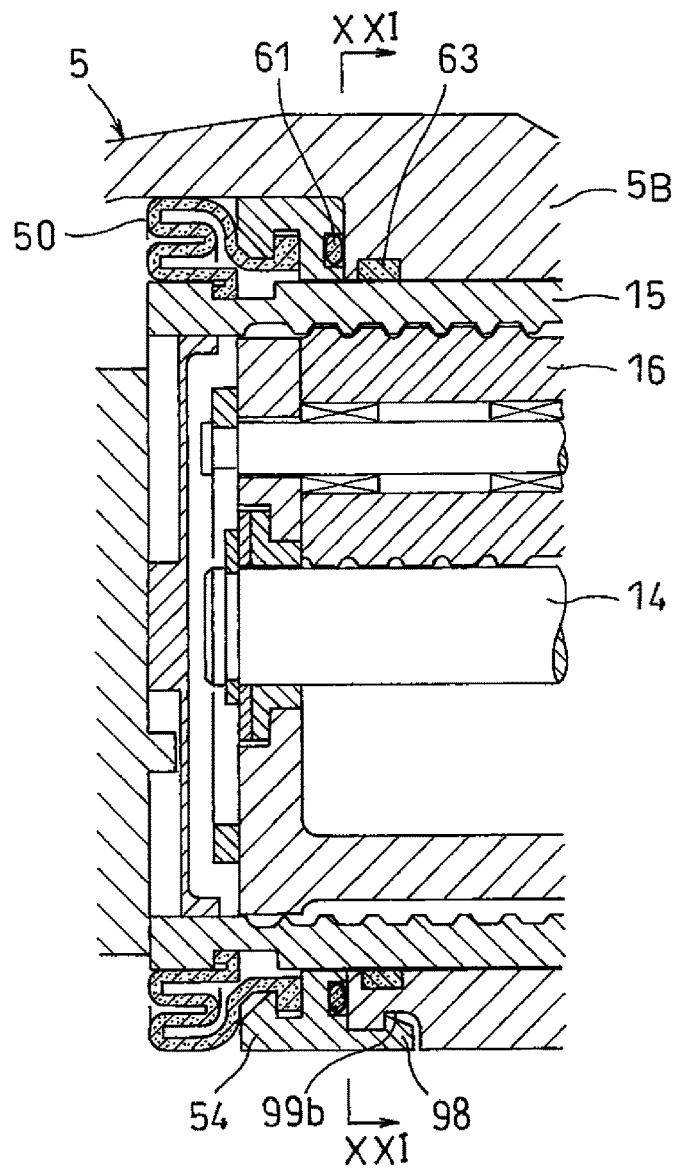
FIG. 20A shows a sectional view of still another means for mechanically fastening the housing for the linear motion mechanism to the support ring.
Figure 20B:
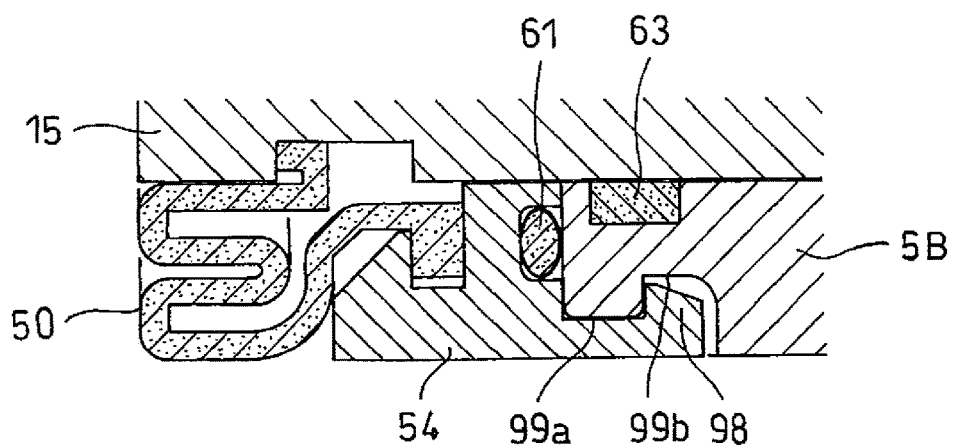
FIG. 20B shows an enlarged sectional view of the fastened portion of FIG. 20A.
Figure 21:
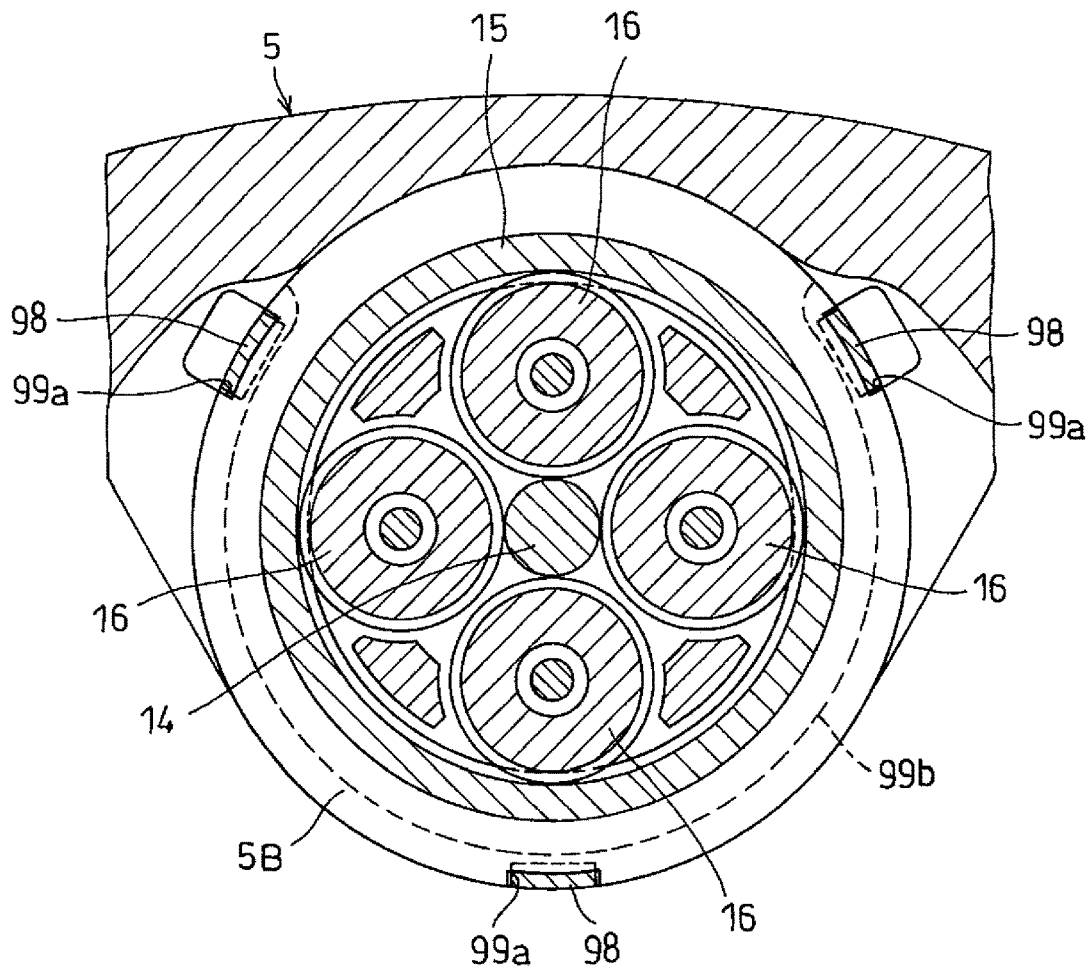
FIG. 21 is a sectional view taken along line XXI-XXI of FIG. 20A.

In the embodiment of FIGS. 20A, 20B and 21, the support ring 54 includes hook pieces 98 on its axial end surface, whereas the housing portion 5B (for the linear motion mechanism 3) has, in its radially outer surface, cutouts 99a and a circumferential groove 99b having a circumferentially discontinuous portion and communicating with the cutouts 99a. By passing the hook pieces 98 through the respective cutouts 99a and engaging the hook pieces 98 into the circumferential groove 99b, the housing portion 5B (for the linear motion mechanism 3) and the support ring 54 are mechanically fastened together. The cutouts 99a and the hook pieces 98 are both arranged at equal angular intervals of 120 degrees.

In the embodiment of FIGS. 18A, 18B and 19, instead of the plurality of circumferential grooves 96 and the plurality of circumferential grooves 97, two circumferentially discontinuous circumferential grooves identical to the groove 99b shown in FIGS. 20A, 20B and 21 may be used. Conversely, the circumferentially discontinuous circumferential groove 99b shown in FIGS. 20A, 20B and 21 may be replaced with the plurality of circumferential grooves 96 or 97 shown in FIGS. 18A, 18B and 19.

The embodiments of FIGS. 16A to 21 may be combined with the embodiment of FIGS. 11 to 15, or combined with the embodiments of FIGS. 7 to 10.

DESCRIPTION OF THE NUMERALS

1. Electric motor
3. Linear motion mechanism
4. Brake disk
5. Caliper body
5A. Claw
5B. Housing (portion) for the linear motion mechanism
5D. Housing fixing plate
7. Brake pad
14. Rotary shaft
15. Outer ring member
16. Planetary roller
25. Helical rib
26. Circumferential groove
50. Boot
54. Support ring
61. Seal ring
63. Seal ring
69. Seal ring
70a. Tapered surface
70b. Tapered surface
71. Seal ring

What is claimed is:
1. An electromechanical brake system comprising:
a brake disk;
a first brake pad and a second brake pad axially opposed to each other with the brake disk disposed therebetween;
a linear motion mechanism including a rotary shaft configured to be rotated by an electric motor, and a tubular outer ring member, the linear motion mechanism being configured such that, when the rotary shaft is rotated by the electric motor, rotation of the rotary shaft is converted to a linear motion of the outer ring member to press the first brake pad against the brake disk;
a caliper body straddling an outer peripheral portion of the brake disk and having a first end and a second end opposite from the first end, the caliper body including a claw axially supporting the second brake pad at the first end;
a housing for accommodating the linear motion mechanism such that component parts of the linear motion mechanism are received in an assembled state within the housing, the housing being disposed at the second end of the caliper body, an inner surface of the housing is in direct contact with the outer ring member;
a seal ring arranged to form a seal between the housing and the outer ring member;
a shrinkable boot closing an opening of the housing at an end of the housing opposed to the brake disk; and
a support ring fitted to an outer periphery of the outer ring member at an end of the outer ring member, the support ring being mechanically fastened to the housing while abutting an open end surface of the housing, wherein the boot has a first end coupled to the outer periphery of the outer ring member at the end of the outer ring member, and a second end coupled to the support ring.

2. The electromechanical brake system of claim 1, wherein the support ring is mechanically fastened to the housing by threaded engagement.

3. The electromechanical brake system of claim 2, wherein the housing is integral with the caliper body.

4. The electromechanical brake system of claim 2, wherein the housing is a separate member from the caliper body, and is detachably attached to a housing fixing plate disposed at the second end of the caliper body.

5. The electromechanical brake system of claim 2, wherein the open end surface of the housing faces the brake disk, wherein the seal ring is a first seal ring, and wherein the electromechanical brake system further comprises a second seal ring providing a seal between the open end surface of the housing and an abutment surface of the support ring abutting the open end surface of the housing.

6. The electromechanical brake system of claim 1 wherein the support ring is mechanically fastened to the housing by a spring.

7. The electromechanical brake system of claim 6, wherein the housing is integral with the caliper body.

8. The electromechanical brake system of claim 6, wherein the housing is a separate member from the caliper body, and is detachably attached to a housing fixing plate disposed at the second end of the caliper body.

9. The electromechanical brake system of claim 6, wherein the open end surface of the housing faces the brake disk, wherein the seal ring is a first seal ring, and wherein the electromechanical brake system further comprises a second seal ring providing a seal between the open end surface of the housing and an abutment surface of the support ring abutting the open end surface of the housing.

10. The electromechanical brake system of claim 1, wherein the housing is integral with the caliper body.

11. The electromechanical brake system of claim 1, wherein the housing is a separate member from the caliper body, and is detachably attached to a housing fixing plate disposed at the second end of the caliper body.

12. The electromechanical brake system of claim 1, wherein the open end surface of the housing faces the brake disk, wherein the seal ring is a first seal ring, and wherein the electromechanical brake system further comprises a second seal ring providing a seal between the open end surface of the housing and an abutment surface of the support ring abutting the open end surface of the housing.

13. The electromechanical brake system of claim 12, wherein the open end surface of the housing is an axial open end surface, and the abutment surface of the support ring abutting the axial open end surface of the housing is an axial abutment surface.

14. The electromechanical brake system of claim 1, wherein the support ring has a rotationally symmetrical shape.

15. The electromechanical brake system of claim 1, wherein the linear motion mechanism comprises a planetary roller mechanism including planetary rollers between the rotary shaft and the outer ring member, and each of the planetary rollers is configured to rotate about an axis of the respective planetary roller and revolve around the rotary shaft due to contact with the rotary shaft, and wherein the outer ring member includes, on an inner periphery thereof, a helical rib, and each of the planetary rollers has, on an outer periphery thereof, circumferential grooves or a helical groove in which the helical rib is engaged.

16. An electromechanical brake system comprising:
a brake disk;
a first brake pad and a second brake pad axially opposed to each other with the brake disk disposed therebetween;
a linear motion mechanism including a rotary shaft configured to be rotated by an electric motor, and a tubular outer ring member, the linear motion mechanism being configured such that, when the rotary shaft is rotated by the electric motor, rotation of the rotary shaft is converted to a linear motion of the outer ring member to press the first brake pad against the brake disk;
a caliper body straddling an outer peripheral portion of the brake disk and having a first end and a second end opposite from the first end, the caliper body including a claw axially supporting the second brake pad at the first end;
a housing for accommodating the linear motion mechanism such that component parts of the linear motion mechanism are received in an assembled state within the housing, the housing being disposed at the second end of the caliper body;
a shrinkable boot closing an opening of the housing at an end of the housing opposed to the brake disk; and
a support ring fitted to an outer periphery of the outer ring member at an end of the outer ring member, the support ring being mechanically fastened to the housing while abutting an open end surface of the housing,
wherein the boot has a first end coupled to the outer periphery of the outer ring member at the end of the outer ring member, and a second end coupled to the support ring,
wherein said open end surface of the housing faces the brake disk,
wherein the electromechanical brake system further comprises at least one seal ring providing a seal between the open end surface of the housing and an abutment surface of the support ring abutting the open end surface of the housing, and between an inner periphery of the housing at an end of the housing facing the brake disk and a sliding surface of the outer ring member in sliding contact with the inner periphery of the housing, and
wherein the at least one seal ring comprises only one seal ring fitted in a seal groove disposed at an inner peripheral portion of the open end surface of the housing and an inner peripheral portion of the abutment surface of the support ring such that the only one seal ring provides a seal between the open end surface of the housing and the abutment surface of the support ring, and between the sliding surface of the outer ring member and a sliding surface of the housing in sliding contact with the sliding surface of the outer ring member.

17. The electromechanical brake system of claim 16, wherein the seal groove is formed partially in the housing and partially in the support ring.

18. The electromechanical brake system of claim 16, wherein the seal groove is partially defined by one of the open end surface of the housing and the abutment surface of the support ring.

19. The electromechanical brake system of claim 16, wherein the seal groove has a rectangular cross-section.

20. The electromechanical brake system of claim 16, wherein the seal groove has a triangular cross-section.

21. The electromechanical brake system of claim 20, wherein the seal groove is defined by two tapered surfaces inclined in opposite directions to each other.

22. An electromechanical brake system comprising:
- a brake disk; a first brake pad and a second brake pad axially opposed to each other with the brake disk disposed therebetween;
- a linear motion mechanism including a rotary shaft configured to be rotated by an electric motor, and a tubular outer ring member, the linear motion mechanism being configured such that, when the rotary shaft is rotated by the electric motor, rotation of the rotary shaft is converted to a linear motion of the outer ring member to press the first brake pad against the brake disk;
- a caliper body straddling an outer peripheral portion of the brake disk and having a first end and a second end opposite from the first end, the caliper body including a claw axially supporting the second brake pad at the first end;
- a housing for accommodating the linear motion mechanism such that component parts of the linear motion mechanism are received in an assembled state within the housing, the housing being disposed at the second end of the caliper body, an inner surface of the housing is in direct contact with the outer ring member;
- a shrinkable boot closing an opening of the housing at an end of the housing opposed to the brake disk; and
- a support ring fitted to an outer periphery of the outer ring member at an end of the outer ring member, the support ring being mechanically fastened to the housing while abutting an open end surface of the housing,
- wherein the boot has a first end coupled to the outer periphery of the outer ring member at the end of the outer ring member, and a second end coupled to an inner peripheral surface of the support ring, the inner peripheral surface arranged to directly oppose the outer peripheral surface of the outer ring member.

* * * * *